United States Patent
Tsang et al.

(10) Patent No.: US 11,630,654 B2
(45) Date of Patent: Apr. 18, 2023

(54) ANALYSIS FOR MODELING DATA CACHE UTILIZATION

(71) Applicant: International Business Machines Corporation, Armonk, NY (US)

(72) Inventors: Wai Hung Tsang, Markham (CA); Prithayan Barua, Atlanta, GA (US); Ettore Tiotto, Whitby (CA); Bardia Mahjour, Newmarket (CA); Jun Shirako, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 17/406,152

(22) Filed: Aug. 19, 2021

(65) Prior Publication Data

US 2023/0067853 A1    Mar. 2, 2023

(51) Int. Cl.
*G06F 8/41* (2018.01)
*G06F 12/0864* (2016.01)

(52) U.S. Cl.
CPC ........ *G06F 8/4442* (2013.01); *G06F 12/0864* (2013.01); *G06F 2212/1021* (2013.01)

(58) Field of Classification Search
None
See application file for complete search history.

(56) References Cited

U.S. PATENT DOCUMENTS

| | | | |
|---|---|---|---|
| 5,805,863 A * | 9/1998 | Chang | G06F 11/3466 717/160 |
| 5,953,531 A | 9/1999 | Megiddo et al. | |
| 9,600,418 B2 * | 3/2017 | Whalley | G06F 12/0862 |
| 11,256,489 B2 * | 2/2022 | Doshi | G06F 8/4442 |
| 2005/0246700 A1 | 11/2005 | Archambault et al. | |
| 2009/0254733 A1 * | 10/2009 | Chen | G06F 12/0862 711/213 |
| 2009/0307675 A1 * | 12/2009 | Ng | G06F 8/4441 717/160 |

(Continued)

OTHER PUBLICATIONS

A. Agarwal, J. Hennessy, and M. Horowitz. 1989. An Analytical Cache Model. ACM Trans. Comput. Syst. 7, 2 (May 1989).

(Continued)

*Primary Examiner* — Marina Lee
(74) *Attorney, Agent, or Firm* — Cantor Colburn LLP; Peter Wang

(57) ABSTRACT

Aspects include modeling data cache utilization for each loop in a loop nest; estimating total data cache lines fetched in one iteration of the loop; and determining the possibility of data cache reuse across loop iterations using data cache lines fetched and associativity constraints. Aspects also include estimating, for memory reference pairs, reuse by one reference of data cache line fetched by another; estimating total number of cache misses for all iterations of the loop; and estimating total number of cache misses of a reference for iterations of a next outer loop as equal to total cache misses for an entire inner loop. Aspects further include estimating memory cost of a loop unroll and jam transformation, without performing the transformation; and extending a data cache model to estimate best unroll-and-jam factors for the loop nest, capable of minimizing total cache misses incurred by the memory references in the loop body.

18 Claims, 16 Drawing Sheets

(56) References Cited

U.S. PATENT DOCUMENTS

2014/0208039 A1* 7/2014 Gilbert .................. G06F 9/383
711/137
2017/0357601 A1 12/2017 Arai

OTHER PUBLICATIONS

Allen et al., "A catalogue of optimizing trans-formations", 1972, 30 pages.
Alt et al., "Cache behavior prediction by abstract interpretation", In Static Analysis, Radhia Cousot and David A. Schmidt (Eds.). Springer Berlin Heidelberg, Berlin, Heidelberg, 1996, 31 pages.
Barua et al.,"Cost-Driven Thread Coarsening for GPU Kernels",In Proceedings of the 27th International Conference on Parallel Architectures and Compilation Techniques, Association for Computing Machinery, New York, NY, 2018, 14 pages.
Baskaran et al., "A Com-piler Framework for Optimization of Affine Loop Nests for Gpgpus", In Proceedings of the 22nd Annual International Conference on Supercomputing, Association for Computing Machinery, New York, NY, 2008, 10 pages.
Bondhugula et al., "A Practical Automatic Polyhedral Parallelizer and Locality Optimizer", In Proceedings of the 29th ACM SIGPLAN Conference on Programming Language Design and Implementation, Association for Computing Machinery, New York, NY, 2008, 13 pages.
Carr et al, "Unroll-and-jam using uniformly generated sets", In Proceedings of 30th Annual International Symposium on Microarchitecture, 1997, pp. 349-357.
Carr et al. "Compiler Optimizations for Improving Data Locality", SIGOPS Oper. Syst. Rev. 28, 5 (Nov. 1994), 11 pages.
Carr et al. "Compiler Optimizations for Improving Data Locality", In Proceedings of the Sixth Int. Conference on Architectural Support for Programming Languages and Operating Systems,Association for Computing Machinery, New York, NY, 1994, 11 pages.
Chatterjee et al. "Exact Analysis of the Cache Behavior of Nested Loops", In Proceedings of the ACM SIGPLAN 2001 Conference on Programming Language Design and Implementation,Association for Computing Machinery, New York, NY, USA, 12 pages.
Disclosed Anonymously; "Method and System for Implementing Optimal Cache Polcy based on Total Cost of Cache Misses", IP.com, IP.com No. IPCOM000254415D, Publication Date: Jun. 26, 2018, 3 pages.
Domagala et al., "Register Allocation and Promotion through Combined Instruction Scheduling and Loop Unrolling", In Proceedings of the 25th International Conference on Compiler Construction, Association for Computing Machinery, New York, NY, 2016,9 pages.
Ferrante et al.,"On Estimating and Enhancing Cache Effectiveness", In Proceedings of the Fourth International Workshop on Languages and Compilers for Parallel Computing, Springer-Verlag, Berlin, Heidelberg, 1991, 16 pages.
Ghosh et al., "Cache Miss Equations: A Compiler Framework for Analyzing and Tuning Memory Behavior", ACM Trans. Program. Lang. Syst. 21, 4 (Jul. 1999),44 pages.
Goff et al. "Practical Depen-dence Testing", In Proceedings of the ACM SIGPLAN 1991 Conference on Programming Language Design and Implementation, Association for Computing Machinery, New York, NY, 1991, 15 pages.

Gysi et al., "A Fast Analytical Model of Fully Associative Caches (PLDI 2019)", Association for Computing Machinery, New York, NY, 14 pages.
Harper et al., "Analytical Modeling of Set-Associative Cache Behavior",IEEE Trans. Comput. 48, 10 (Oct. 1999), 16 pages.
Hill, "Aspects of Cache Memory and Instruction Buffer Performance", Ph.D. Dissertation. EECS Department, University of California, Berkeley, 1987, 183 pages.
Kennedy et al., "Optimizing for Paral-lelism and Data Locality", In Proceedings of the 6th International Conference on Supercomputing (ICS âĂŹ92), Association for Computing Machinery, New York, NY, 1992, 12 pages.
Kuck et al., "Dependence Graphs and Compiler Optimizations", In Proceedings of the 8th ACM SIGPLAN-SIGACT Symposium on Principles of Programming Languages, Association for Computing Machinery, New York, NY, 1981, 12 pages.
Leather et al., "Raced Profiles: Efficient Selection of Competing Compiler Optimizations", In Proceedings of the 2009 ACM SIGPLAN/SIGBED Conference on Languages, Compilers, and Tools for Embedded Systems, Association for Computing Machinery, New York, NY, 2009, 10 pages.
Louis-Noël Pouchet, "Polybench: The Polyhedral benchmark suite", 2015, 4 pages.
Murthy et all, "Optimal loop unrolling for GPGPU programs", In 2010 IEEE International Symposium on Parallel Distributed Processing (IPDPS), 2010, 11 pages.
Qasem et al. "Profitable Loop Fusion and Tiling Using Model-Driven Empirical Search. In Proceedings of the 20th Annual International Conference on Supercomputing", Association for Computing Machinery, New York, NY, 2006, 10 pages.
Rocha et al., "Vectorization-Aware Loop Unrolling with Seed Forwarding", In Pro-ceedings of the 29th International Conference on Compiler Construction,Association for Computing Machinery, New York, NY, 2020, 13 pages.
Segarra et al., "Automatic Safe Data Reuse Detection for the WCET Analysis of Systems With Data Caches", IEEE Access, vol. 8, Oct. 2020, 14 pages.
Shirako et al. "Analytical Bounds for Optimal Tile Size Selection", In Compiler Construction, Michael O'Boyle (Ed.). Springer Berlin Heidelberg, Berlin, Heidelberg, 2012, 20 pages.
Stephenson et al., "Predicting unroll factors using supervised classification", In International Symposium on Code Generation and Optimization, 2005, pp. 123-134.
Vivek Sarkar, "Automatic Selection of High-Order Transformations in the IBM XL Fortran Compilers", IBM J. Res. Dev. 41, 3 (May 1997), 32 pages.
Vivek Sarkar, "Optimized Unrolling of Nested Loops", In Proceedings of the 14th International Conference on Supercomputing, Association for Computing Machinery, New York, NY, 2000, 14 pages.
Wenlei Bao, Sriram Krishnamoorthy, Louis-Noel Pouchet, and P. Sa-dayappan. 2017. Analytical Modeling of Cache Behavior for Affine Programs. Proc. ACM Program Lang. 2, POPL, Article 32 (Dec. 2017), 26 pages.
Wolf et al., "Combining Loop Transformations Considering Caches and Scheduling", IEEE, Dec. 1996, pp. 274-286.

* cited by examiner

Figure 2A

```
1   // N = M = 1024
2   // Unroll-Jam by (U_1, U_2)
3   for (i = 0; i < N; i++) {
4      q[i] = SCALAR_VAL(0.0);
5      for (j = 0; j < M; j++) {
6         // U_2 copies of s[j], U_1 copies of r[i]
7         // U_1*U_2 copies of A[i][j]
8         s[j] = s[j] + r[i] * A[i][j];
9         // U_1 copies of q[i], U_2 copies of p[j]
10        q[i] = q[i] + A[i][j] * p[j];
11     }}
```

Listing 1 code snippet 200

Figure 2B

```
1   // Unroll-Jam by (2, 1)
2   for (i = 0; i < N; i+=2) {
3      q[i] = SCALAR_VAL(0.0);
4      q[i+1] = SCALAR_VAL(0.0);
5      for (j = 0; j < M; j++) {
6         s[j] = s[j] + r[i] * A[i][j];
7         q[i] = q[i] + A[i][j] * p[j];
8         s[j] = s[j] + r[i+1] * A[i+1][j];
9         q[i+1] = q[i+1] + A[i+1][j] * p[j];
10     }}
```

Listing 2 code snippet 250

1100

Figure 13
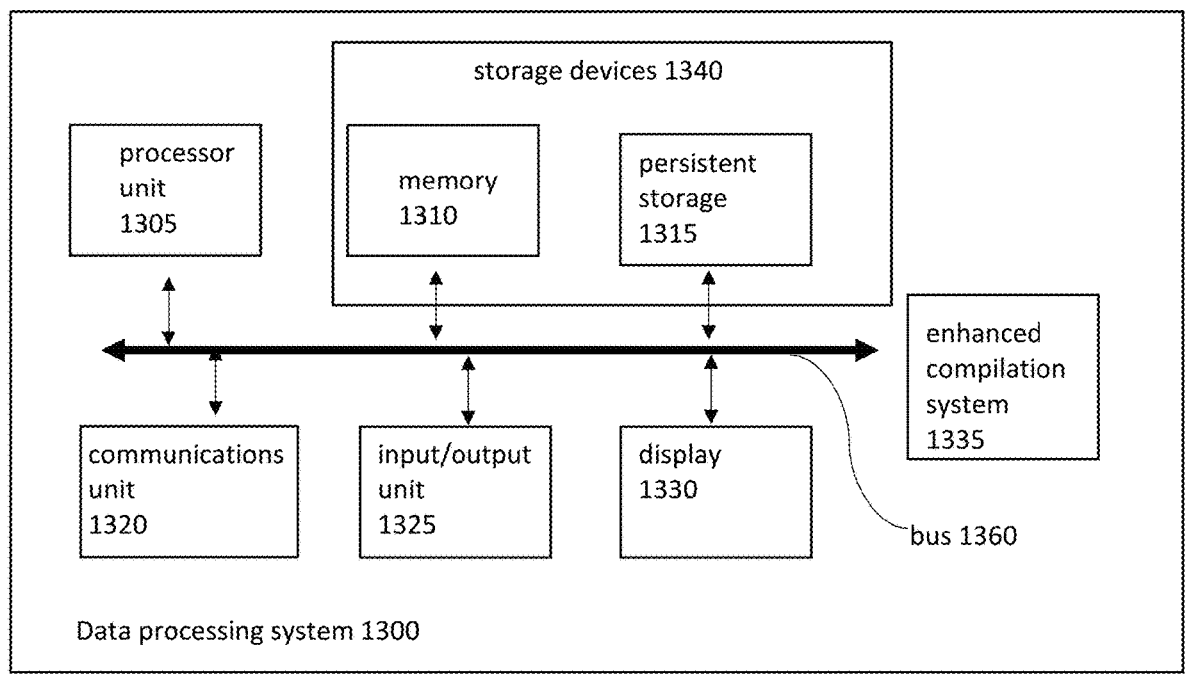
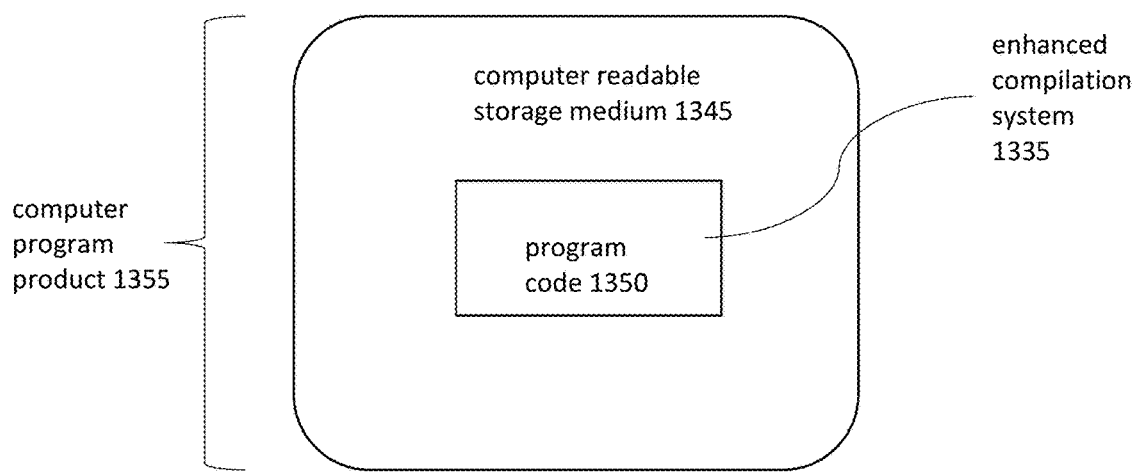

“ANALYSIS FOR MODELING DATA CACHE UTILIZATION”

BACKGROUND

The present invention relates to compilers in data processing systems, and more specifically, to analysis techniques to guide optimizations of compilations using a compiler in a data processing system.

SUMMARY

Embodiments of the present invention are directed to modeling data cache utilization in a loop nest. A non-limiting example computer-implemented method includes in response to receiving the loop nest, processing each loop in the loop nest, starting from an innermost loop, estimating total data cache lines fetched for executing one iteration of the loop under consideration. It is determined whether data cache line reuse is possible across loop iterations using data cache lines fetched in one iteration and set associativity constraints. In response to receiving information on cache constraints, estimating for each pair of memory references whether one reference can reuse a data cache line fetched by another reference. In response to receiving information on all memory references which result in a cache miss, estimating a total number of cache misses for all iterations of a given loop. In response to estimating the number of total cache misses for all iterations of the given loop, processing a next outer loop to estimate the total number of cache misses for all iterations of the next outer loop. An output of total cache misses of a reference is computed for a single iteration of the next outer loop as equal to the total cache misses for an entire inner loop.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

FIGS. 2A and 2B are textual representations of code snippets before and after an unroll-and-jam loop transformation used in an embodiment of the disclosure;

FIG. 13 is a block diagram of an exemplary data processing system operable for various embodiments of the disclosure.

DETAILED DESCRIPTION

Figure 1:
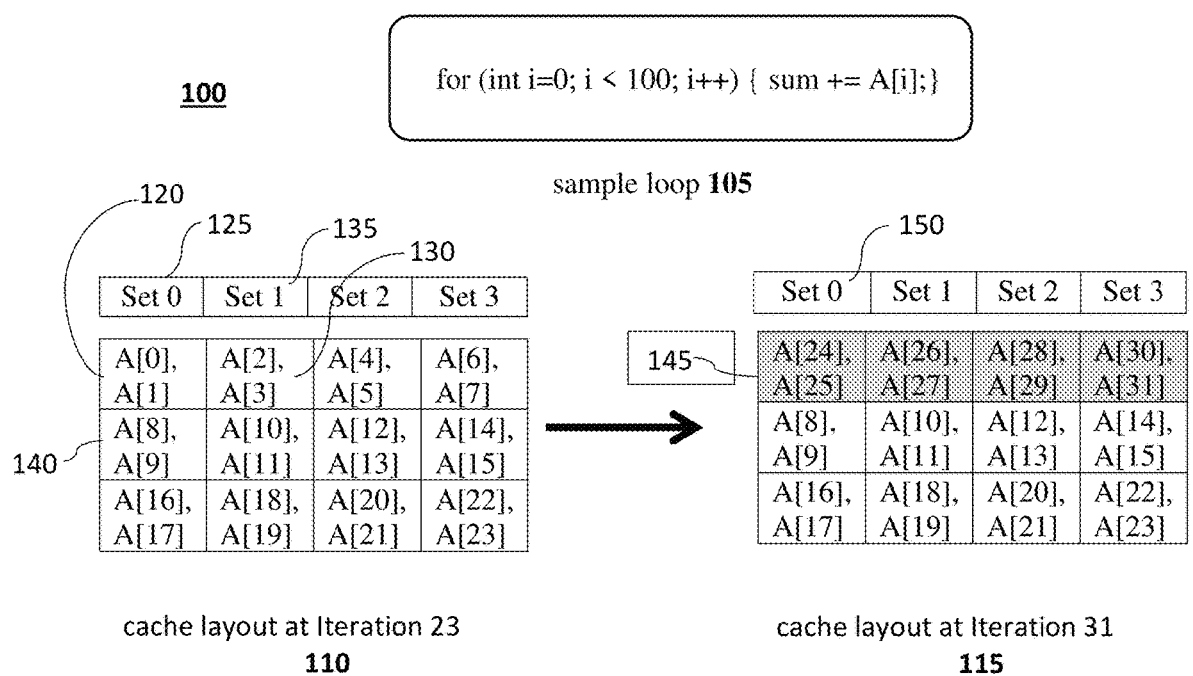
FIG. 1 is a tabular representation of the data cache behavior of a simple loop with one-dimensional array access in various embodiments of the disclosure.

The description, which follows, and the embodiments described therein, is provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference of the present invention.

The following detailed description of the embodiments of the present invention does not limit the implementation of the present invention to any particular data processing system programming language. The present invention may be implemented in any data processing system programming language provided that the Operating System (OS) provides the facilities that may support the requirements of the embodiments of the present invention. Any limitations presented may be quite likely a result of a particular type of OS, data processing system programming language, or data processing system and may not be a limitation of the embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Past approaches to modeling data cache behavior in optimizing compilers have been used to drive several loop transformations such as loop permutation, loop fusion, loop distribution, and loop unroll-and-jam to improve memory hierarchy utilization. As memory cost continues to increase in modern central processor unit (CPU) architectures, there is a growing need to design more accurate data cache cost models.

Embodiments of the disclosure provide a novel static analysis that extends past work on modeling data cache behavior to also consider outer (non-innermost) loops, as well as constraints such as data cache set associativity that are important to accurately model real hardware behavior. For example, this new static analysis is used to guide the loop unroll-and-jam transformation by estimating data cache misses that would occur after performing the transformation for different possible configurations, and aids in heuristically determining the most profitable set of unroll factors.

Effectiveness of embodiments of the disclosure providing a capability for the novel static analysis has been tested using example tests cases on different hardware platforms using an implementation in an LLVM based compiler and measuring the effect on the loop unroll-and-jam transformation driven by embodiments with a well-known PolyBench benchmark suite (Louis-Noel Pouchet. 2015. Polybench: The Polyhedral benchmark suite. https://web.cse.ohio-state.edu/~pouchet.2/software/polybench/). The results indicate that the static analysis provided by an embodiment can be used to guide unroll-and-jam decisions across different target architectures, and typically deliver significant performance improvements.

Use of embodiments of the disclosure provide an analysis to guide the loop unroll-and-jam transformation in order to reduce memory cost (in terms of latency) of a loop nest. An embodiment of the disclosure models the behavior of a set-associative data cache configuration and estimates the total cache misses of a given loop nest. The analysis accounts for data reuse opportunities in a loop nest and estimates the data cache misses that would occur after performing the loop unroll-and-jam transformation on the given loop nest, for a given set of unroll factors. The analysis prescribes a set of unroll factors that heuristically maximize data locality and memory reuse.

An embodiment includes an analysis pass that estimates the benefits of a loop transformation and guides the compiler decision on when and how to perform the transformation. Although examples used in the disclosure demonstrate the effectiveness of the memory cost model on the loop unroll-and-jam transformation, one skilled in the art may reasonably conclude embodiments are applicable to other transformations as well.

While most recent work on static modeling of cache behavior (Wenlei Bao, Sriram Krishnamoorthy, Louis-Noel Pouchet, and P. Sadayappan. 2017. Analytical Modeling of Cache Behavior for Affine Programs. POPL. https://doi.org/10.1145/3158120) and (Tobias Gysi, Tobias Grosser, Laurin Brandner, and Torsten Hoefler. 2019. A Fast Analytical Model of Fully Associative Caches (PLDI 2019). https://doi.org/10.1145/3314221.3314606) focuses on the accuracy of the model for affine programs, an embodiment of the disclosure provides a fast and effective static cost model designed to compare relative benefits of different loop transformations in terms of memory cost. In summary, an embodiment of the disclosure typically provides a capability in areas including an efficient modeling of set-associative caches to estimate total cache misses of a loop nest, a modeling of memory reuse across iterations of loops at arbitrary depth in a loop nest, and integration of the memory model into the loop unroll-and-jam cost model, to estimate the impact of the loop unroll-and-jam transformation on cache misses and memory reuse.

Analysis performed by an embodiment of the disclosure uses register pressure information to consider additional memory accesses due to register spills. The effect of a loop transformation, for example loop unroll-and-jam, on register pressure is modeled without performing the transformation.

An embodiment of the disclosure is implemented as an LLVM compiler pass and evaluated using the Polybench benchmark suite. The impact of the analysis from an embodiment of the disclosure was compared with a baseline LLVM unroll-and-jam analysis used to estimate the best unroll factors for a given loop nest. The comparison typically illustrated a speedup obtained by the embodiment compared to the baseline, on 3 different computing architecture platforms.

Embodiments of the disclosure assume that any memory access instruction can lead to events in a set-associative data cache including: load instruction issues a virtual address, which gets translated to the physical address; a physical address is mapped to a corresponding L1 data cache set; when the data cache line containing the address is not present, it is requested from the L2 data cache; the fetched data cache line from the L2 data cache is placed in the corresponding cache set in the L1 data cache; and when the cache set is full, then using a replacement policy, one of the data cache lines is evicted.

However, accurate static modeling of all the above events is not feasible in most cases. For example, the virtual to physical address translation is unknown at compile time, and therefore the cache set mapping is also unknown. As a result, the static analysis makes several simplifying and conservative assumptions to model complex data cache behavior.

FIG. 1 is a tabular representation of cache behavior of a simple loop with one-dimensional array access. View 100 is an example of a 3-Way set-associative cache with a total of 4 cache sets used with sample loop 105 showing a transition from cache layout at iteration 23 110 to cache layout at iteration 31 115. For this example, assume a data cache line is two elements wide, so that every data cache line consists of 2 array elements (ignoring the element size). Further assume the base address of array element A[0] in cell 120 maps to Set-0 in cell 125. Then access to array element A[1] in cell 120 hits the data cache line corresponding to array element A[0] in Set-0. The next data cache line corresponding to array elements A[2] and A[3] in cell 130 is mapped to Set-1, in cell 135 and so on. In this example every other array reference ends up in a cache miss. View 100 also illustrates how the array elements are mapped to different cache sets. The data cache line corresponding to array elements A[8] and A[9] in cell 140 wraps around and is mapped to cache Set-0 in cell 125. Typically, the least significant bits of a memory address are used to determine to which cache set to it maps to.

For the purpose of static modeling set associativity, the static analysis assumes a cache layout as illustrated in the FIG. 1. The access to array element A[24] in cell 145 maps back to Set-0 in cell 150, that is the least recently used data cache line (A[0], A[1]), previously of cell 120 is evicted. This process continues for the following iterations as illustrated in the FIG. 1.

FIGS. 2A and 2B are textual representations of code snippets used in a loop unroll-and-jam transformation. Loop unroll-and-jam is a combined operation of loop unrolling and jamming. A catalogue of optimizing transformations). In this example two code snippets, bicg (from Polybench), Listing 1 code snippet 200 prior to a loop unroll-and-jam transformation, and Listing 2 code snippet 250 after a loop unroll-and-jam transformation, are used to illustrate the cache reuse opportunities exposed by the loop unroll-and-jam transformation, and significance of modeling the cache associativity to reason about respective performance implications. The terms bicg and Bicg may be used interchangeably.

With reference to Listing 1 code snippet 200, consider the effect of loop unroll-and-jam on the code snippet in Listing 1. The loop nest contains 5 unique memory accesses, and has bounds of (N, M), hence the total number of unique memory loads for the entire loop nest is (N*M*5). In Listing 1 code snippet 200, several memory loads are loop independent, therefore, unroll-and-jamming the loop nest can reduce the total number of memory loads required. Comments on lines 6 and 7 in Listing 1 code snippet 200 illustrate the copies of each memory load required when the loop nest is unroll-and-jammed by using unroll factors of (U1, U2). For example, because array reference s[j] depends only on the loop with induction variable j, it has U2 instances after the loop unroll-and-jam transformation. Similarly, array reference A[i][j] requires U1*U2 memory loads after the transformation. The total memory load instructions issued by Listing 1 code snippet 200 will keep decreasing with an increase in the unroll-and-jam factors (U1, U2). To what extent does the reduction in total loads translate into a performance improvement?Listing 1 code snippet 200 depicts a loop nest before applying the loop unroll-and-jam transformation. Listing 2 code snippet 250 of FIG. 2B depicts the result of applying the loop unroll-and-jam transformation to Listing 1 code snippet 200 using unroll factors of (2,1). The transformation must maintain the order of data dependencies. If the transformation reverses the execution order of any array reference, then the transformation is deemed illegal. Unroll-and-jam using uniformly generated sets. In Proceedings of 30th Annual International Symposium on Microarchitecture. https://doi.org/10.1109/MICRO.1997.645832) and (Vivek Sarkar. 2000. Optimized Unrolling of Nested Loops. In Proceedings of the 14th International Conference on Supercomputing. https://doi.org/10.1145/335231.335246).

Figure 3:
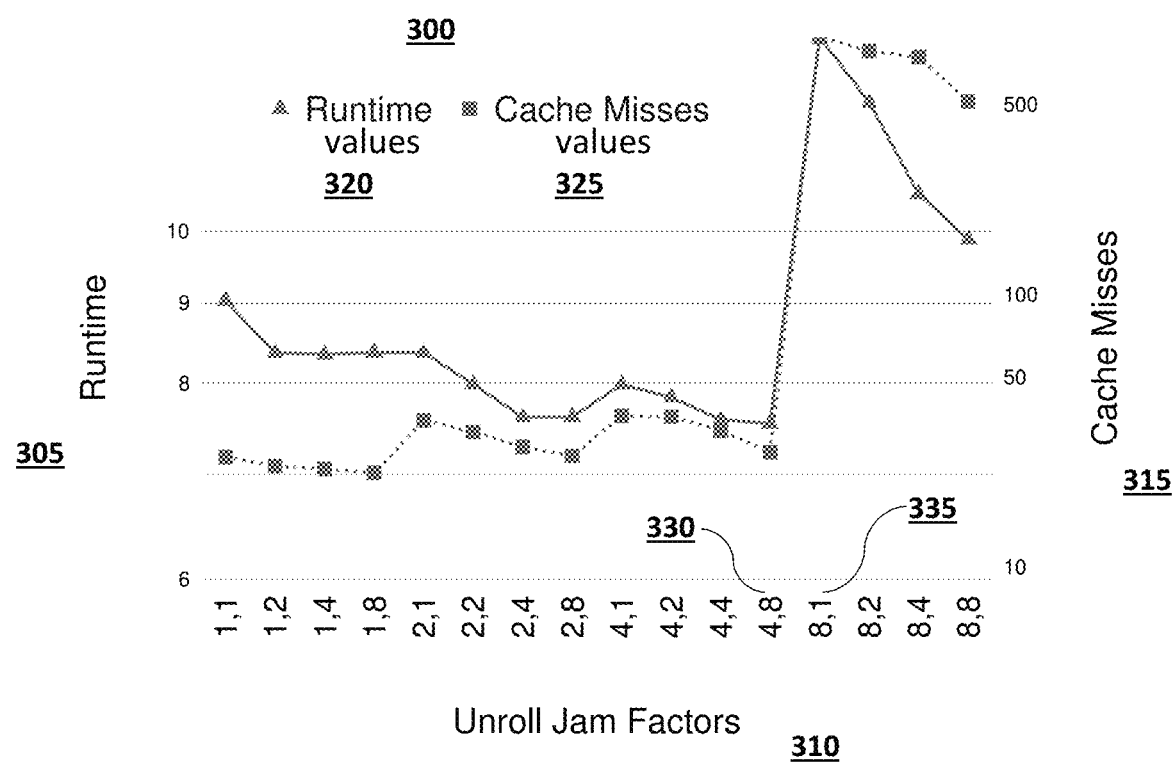
FIG. 3 is an example in a graphical representation form of an evaluation of performance implications and data cache misses for different unroll factors for a sample program called 'Bicg', used in an embodiment of the disclosure.

FIG. 3 is an example in a graphical representation form of an evaluation of performance implications for loop unroll-and-jam transformation when using different possible unroll factors in an embodiment of the disclosure. View 300 in this example of runtime 305 versus L1 data cache misses 315 on a log scale are results from experiments on Listing 1 code snippet 200 of FIG. 2A and shows runtime values 320 decreasing up to the unroll-and-jam factors 310 of 330 (Wenlei Bao, Sriram Krishnamoorthy, Louis-Noel Pouchet, and P. Sadayappan. 2017. Analytical Modeling of Cache Behavior for Affine Programs. POPL. https://doi.org/10.1145/3158120) and (Steve Carr, Kathryn S. McKinley, and Chau-Wen Tseng. 1994. Compiler Optimizations for Improving Data Locality. https://doi.org/10.1145/381792.195557) but increases by almost 20% for unroll factors 335 (A. Agarwal, J. Hennessy, and M. Horowitz. 1989. https://doi.org/10.1145/63404.63407). The L1 data cache-miss 325 are plotted and show a strong correlation between a reduction in data cache misses and the corresponding runtime speedup. The sudden increase in data cache-misses after unroll-and-jamming the outer-loop by a factor of 8 is attributed to cache associativity. Consider the accesses to array A in the loop body after unroll-and-jamming by a factor of (8,1): A[i][j], A[i+1][j], A[i+2][j], . . . , A[i+7][j]. These accesses map to the same cache set and therefore contribute to an increase in conflict misses. This causes cache thrashing and precludes data cache line reuse across the iterations of the outer loop.

Figure 4:
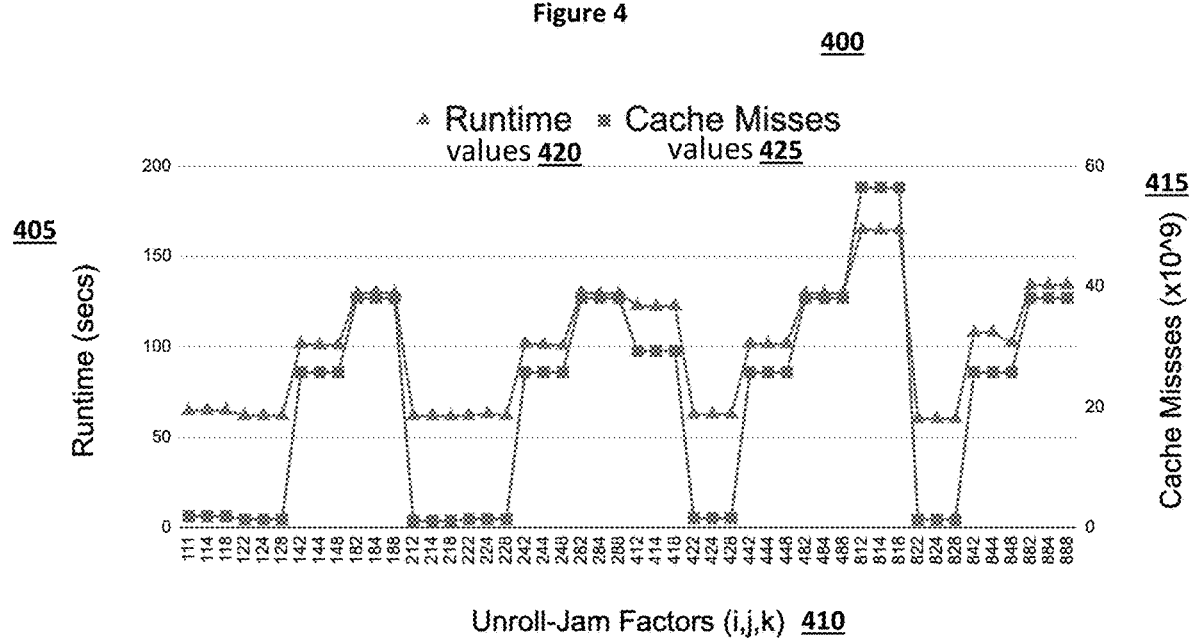
FIG. 4 is an example in a graphical representation form of an evaluation of performance implications and data cache misses for different unroll factors for a sample program called 'heat-3d', used in an embodiment of the disclosure.

FIG. 4 is a graphic representation of corresponding runtime values plotted against cache-miss values. Graph 400 is derived using a heat-3d code snippet available from Polybench which is a 7-point stencil computation. Graph 400 has axis of runtime 405, unroll jam factors 410 and L1 data cache misses 415. Runtime values 420 and cache miss values 425 are plotted. The heat-3d code snippet is a 3-level loop nest, denoted by the loop indices (i,j,k). There are two key observations from this example. Only the unroll factor for index j, corresponding to the loop at depth 2, yields a performance difference. Cache misses are reduced whenever the loop corresponding to index j is unrolled by a factor less than or equal to 2. Analysis of cache events triggered by running this example confirmed that data cache line reuse is exposed across iterations of the j loop if the unroll factor is less than or equal to 2. For all other unroll factors, the conflict misses increase which causes cache thrashing and precludes data cache line reuse.

Figure 5:
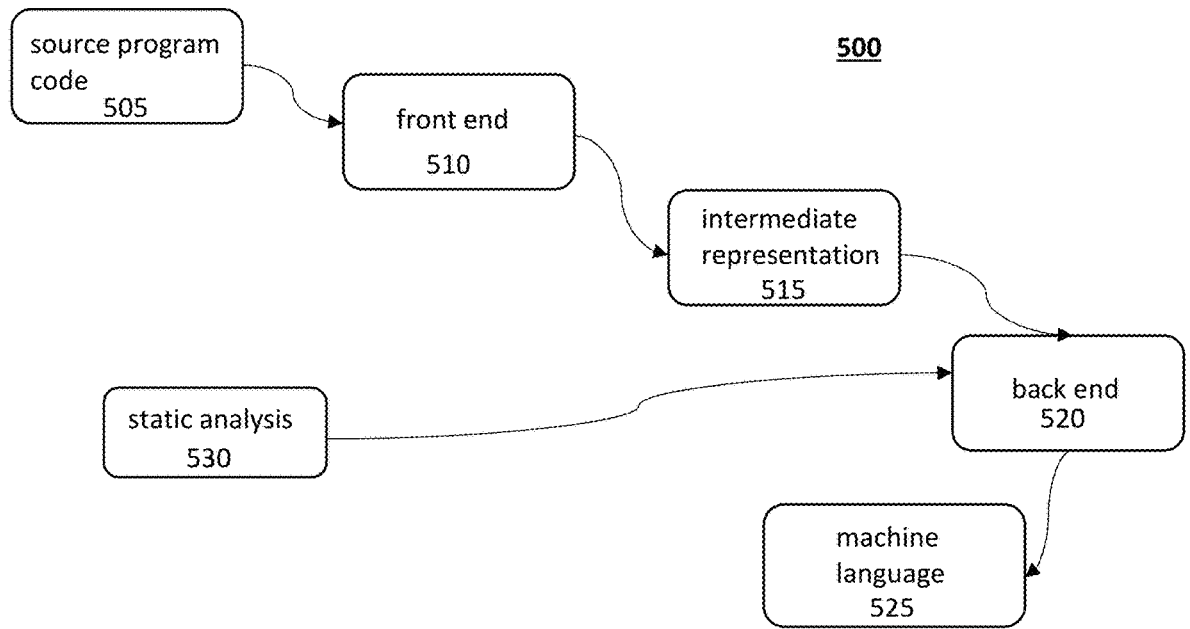
FIG. 5 is a schematic representation of an overview of a compilation process used in an embodiment of the disclosure.

FIG. 5 is a schematic representation of an overview of an enhanced compilation process used in an embodiment of the disclosure. Compilation process 500 begins with source program code 505 as input to a set of operations using an enhanced compilation system. Source program code 505 is consumed by front end 510 of the enhanced compilation system. Several analysis techniques may be employed within front end 510 including lexical, syntactical, and semantic analysis. Output of front end 510 is provided in the form of intermediate representation (IR) 515. A format of IR 515 is determined by the compilation system and is dependent upon the tooling used in front end 510 and back end 520 as well as other tools that may consume IR 515. IR 515 is provided as input to back end 520 for use in static analysis and transformation operations including optimization of the intermediate representation and machine code generation. Output of operations occurring using back end 520 is in the form of machine language code 525.

In an embodiment of the disclosure, an enhanced static analysis technique, including static analysis 530, provides a capability of using a model to estimate relative change in cache misses to guide different loop transformations. Static analysis 530 is employed in back end 520 during the compilation process. Therefore, an embodiment of the disclosure enables further optimizations, including loop transformations, to make better decisions, which improve execution-time performance of computer executable programs.

There has been a significant amount of investigation on the topic of cache modeling and estimating the cache misses of a given loop nest. Ferrante et al. (Jeanne Ferrante, Vivek Sarkar, and W. Thrash. 1991. On Estimating and Enhancing Cache Effectiveness) and Sarkar (V. Sarkar. 1997. Automatic Selection of High-Order Transformations in the IBM XL FORTRAN Compilers. IBM J. Res. Dev. 41, 3 (May 1997), https://doi.org/10.1147/rd.413.0233) introduced a model to approximate several distinct accesses and distinct data cache lines accessed by multiple array references in a loop nest. More recently Gysi et al. (Tobias Gysi, Tobias Grosser, Laurin Brandner, and Torsten Hoefler. 2019. A Fast Analytical Model of Fully Associative Caches (PLDI 2019). https://doi.org/10.1145/3314221.3314606) presented a symbolic counting technique to accurately estimate the cache misses of an application. Prior work generally ignores the set-associativity property of data caches and therefore fails to account for potential data cache misses due to cache line eviction, which was an important motivation for embodiments of the disclosure. Additionally, previous work typically did not consider register spills as part of a memory cost model.

Agarwal et al. (A. Agarwal, J. Hennessy, and M. Horowitz. 1989. An Analytical Cache Model. ACM Trans. Comput. Syst. 7, 2 (May 1989), 184-215. https://doi.org/10.1145/63404.63407) and Harper et al. (John S. Harper, Darren J. Kerbyson, and Graham R. Nudd. 1999. Analytical Modeling of Set-Associative Cache Behavior. https://doi.org/10.1109/12.805152) developed analytical models for set-associative caches. Abstract interpretation has also been used to model set associative least recently used (LRU) caches by Martin et al. (Martin Alt, Christian Ferdinand, Florian Martin, and Reinhard Wilhelm. 1996. Cache behavior prediction by abstract interpretation. In Static Analysis, Radhia Cousot and David A. Schmidt (Eds.). Springer Berlin Heidelberg, Berlin, Heidelberg, 52-66) and Ghosh et al. (Somnath Ghosh, Margaret Martonosi, and Sharad Malik. 1999. Cache Miss Equations: A Compiler Framework for Analyzing and Tuning Memory Behavior. https://doi.org/10.1145/325478.325479) derived cache miss equations for perfect loop nests with data dependencies represented by reuse vectors. Chatterjee et al. (Siddhartha Chatterjee, Erin Parker, Philip J. Hanlon, and Alvin R. Lebeck. 2001. Exact Analysis of the Cache Behavior of Nested Loops. In Proceedings of the ACM SIGPLAN 2001 Conference on Programming Language Design and Implementation (PLDI '01). https://doi.org/10.1145/378795.378859) presented an approach to use Presburger formulas to count cache misses for set associative caches. And most recently Bao et al. (Wenlei Bao, Sriram Krishnamoorthy, Louis-Noel Pouchet, and P. Sadayappan. 2017. Analytical Modeling of Cache Behavior for Affine Programs. Proc. ACM Program. Lang. 2, https://doi.org/10.1145/3158120) presented PolyCache, an analytical model for set-associative caches for polyhedral programs with static control flow.

Most of the prior work mentioned above has focused on accurately estimating the cache misses of an application. Embodiments of the disclosure were developed to provide a simple and approximate model to estimate relative change in cache misses due to different transformation decisions and to ultimately guide the corresponding loop transformation.

Similarly, a considerable amount of work has been done using cost models to guide loop transformations. Wolf et al. (Monica S. Lam and Michael E. Wolf. 2004. A data locality optimizing algorithm. https://doi.org/10.1145/989393.989437) addressed the problem of the choice of loop transformations by developing a cost model to increase data locality. Kennedy et al. (Ken Kennedy and Kathryn S. McKinley. 1992. Optimizing for Parallelism and Data Locality. In Proceedings of the 6th International Conference on Supercomputing (ICS '92). Association for Computing Machinery, New York, N.Y., USA, 323-334. https://doi.org/10.1145/143369.143427) proposed a simple memory model which optimizes for data cache line reuse and selects a loop ordering for generating parallel code for shared-memory multiprocessors. Can et al. (Steve Can, Kathryn S. McKinley, and Chau-Wen Tseng. 1994. Compiler Optimizations for Improving Data Locality. SIGOPS Oper. Syst. Rev. 28, 5 (November 1994), 252-262. https://doi.org/10.1145/381792.195557) proposed a very simple cost model to estimate cache misses incurred by a loop nest and use it to guide several loop transformations such as, loop permutation, loop fusion, loop distribution and loop reversal. However, this previous work only considered reuse across the innermost loop and did not account for conflict misses in set-associative caches.

Bondhugola et al. (Uday Bondhugola, Albert Hartono, J. Ramanujam, and P. Sadayap-pan. 2008. A Practical Automatic Polyhedral Parallelizer and Locality Optimizer. In Proceedings of the 29th ACM SIGPLAN Conference on Programming Language Design and Implementation (PLDI '08). https://doi.org/10.1145/1375581.1375595) developed a cost model driven automatic transformation framework, PLuTo. They use a polyhedral model for optimizing regular programs and find affine transformations for efficient loop tiling in order to optimize applications for better parallelism and data locality. Shirako et al. (Jun Shirako, Kamal Sharma, Naznin Fauzia, Louis-Noel Pouchet, J. Ramanujam, P. Sadayappan, and Vivek Sarkar. 2012. Analytical Bounds for Optimal Tile Size Selection. In Compiler Construction, Michael O'Boyle (Ed.). Springer Berlin Heidelberg, Berlin, Heidelberg, 101-121) employed DL model (J. Ferrante et al.), for optimal tile size selection in a loop tiling transformation. Qasem et al. (Apan Qasem and Ken Kennedy. 2006. Profitable Loop Fusion and Tiling Using Model-Driven Empirical Search. In Proceedings of the 20th Annual International Conference on Supercomputing (ICS '06). https://doi.org/10.1145/1183401.1183437) presented an auto-tuning approach using a detailed analytical model characterizing the interaction of loop fusion and tiling, across a memory hierarchy for different architectures.

Sarkar (Vivek Sarkar. 2000. Optimized Unrolling of Nested Loops. In Proceedings of the 14th International Conference on Supercomputing (ICS '00). https://doi.org/10.1145/335231.335246) presented a cost model to select unroll factors for perfectly nested loops. The cost model considers the total load store instructions and instruction level parallelism (ILP) exposed by the loop unroll-and-jam transformation. It also considers register spills and instruction cache capacity constraints to restrict the search space. Unlike previous approaches, using an embodiment of the disclosure, the cost model tries to minimize the L1 data cache misses and can select unroll factors that increase the total number of register spills.

Leather et al. (Hugh Leather, Michael O'Boyle, and Bruce Worton. 2009. Raced Profiles: Efficient Selection of Competing Compiler Optimizations. In Proceedings of the 2009 ACM SIGPLAN/SIGBED Conference on Languages, Compilers, and Tools for Embedded Systems (LCTES '09). https://doi.org/10.1145/1542452.1542460) presented a profile driven approach for selecting an optimal unroll-and-jam factor. A sequential sampling plan was developed to automatically adapt to the experiments so that the best optimization settings, for example, loop unrolling factor, can be determined only with a required number of profiling runs for the optimization. Baskaran et al. (Muthu Manikandan Baskaran, Uday Bondhugula, Sriram Krishnamoorthy, J. Ramanujam, Atanas Rountev, and P. Sadayappan. 2008. A Compiler Framework for Optimization of Affine Loop Nests for GPGPUs. In Proceedings of the 22nd Annual International Conference on Supercomputing (ICS '08). https://doi.org/10.1145/1375527.1375562) proposed a compilation framework for automatic parallelization and performance optimization of affine loop nests on general-purpose graphics processing unit (GPGPU) with various loop transformations including multi-level loop tiling and unrolling, where a loop unrolling factor is selected by a model-driven empirical search. Stephenson et al. (M. Stephenson and S. Amarasinghe. 2005. Predicting unroll factors using supervised classification. In International Symposium on Code Generation and Optimization. https://doi.org/10.1109/CGO) presented a machine learning approach to predict the optimal unroll factor. This machine learning approach uses multi-class classification and support vector machines, to guide compiler decisions. Domagala et. al (Lukasz Domagala, Duco van Amstel, Fabrice Rastello, and P. Sadayappan. 2016. Register Allocation and Promotion through Combined Instruction Scheduling and Loop Unrolling. In Proceedings of the 25th International Conference on Compiler Construction (CC 2016). https://doi.org/10.1145/2892208.2892219) demonstrated an approach of combining loop unrolling and instruction scheduling to reduce register pressure of a loop. Murthy et al. (G. S. Murthy, M. Ravishankar, M. M. Baskaran, and P. Sadayappan. 2010. Optimal loop unrolling for GPGPU programs. In 2010 IEEE International Symposium on Parallel Distributed Processing (IPDPS). 1-11) developed an approach to identify optimal unroll factors for GPGPU programs. Barua et al. (Prithayan Barua, Jun Shirako, and Vivek Sarkar. 2018. Cost-Driven Thread Coarsening for GPU Kernels. In Proceedings of the 27th International Conference on Parallel Architectures and Compilation Techniques (PACT 18). https://doi.org/10.1145/3243176.3243196) presented a cost model for selecting unroll factors for guiding the thread coarsening transformation for graphics processing unit (GPU) kernels. Most recently Rocha et al. (Rodrigo C. O. Rocha, Vasileios Porpodas, Pavlos Petoumenos, Luis F. W. Goes, Zheng Wang, Murray Cole, and Hugh Leather. 2020. Vectorization-Aware Loop Unrolling with Seed Forwarding. In Proceedings of the 29th International Conference on Compiler Construction (CC 2020). https://doi.org/10.1145/3377555.3377890) presented a loop unrolling heuristic that optimizes for opportunities of superword-level parallelism (SLP) vectorization. There has been a significant amount of work on loop unrolling, each trying to optimize a different metric. Unlike prior work, an embodiment of the disclosure provides a capability for modeling of set-associative data cache for different unroll factors and consideration of register spills to infer an optimal unroll-and-jam configuration.

Figure 6:
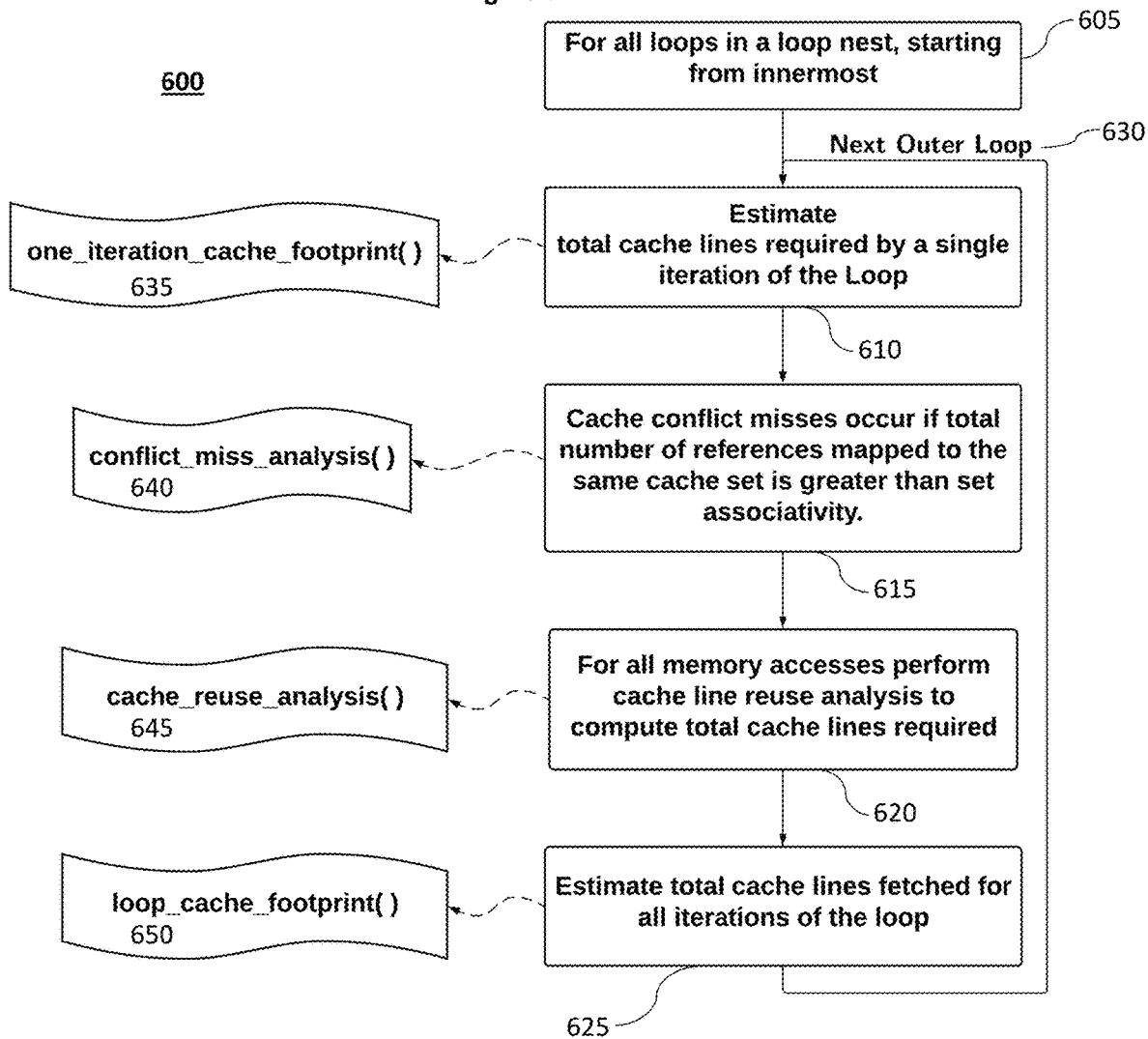
FIG. 6 is a flow diagram for a process of modeling a set-associative data used in process 1100 of FIG. 11A, process 1128 of FIG. 11B, and process 1150 of FIG. 11C in an embodiment of the disclosure.

FIG. 6 is a flow diagram for a process of modeling the behavior of a set-associative data cache. Process 600 represents a set of steps for the estimation of the cost, in terms of data cache consumption, for a loop nest. Process 600 receives a loop nest as input and generates an estimate of the total number of data cache line misses for an L1 data cache configuration.

Process 600, given a loop nest, considers each loop in the loop nest starting from an innermost loop (step 605). The total data cache lines fetched for executing one iteration of the loop under consideration is estimated (step 610). This step uses another process 635 referred to as "one_iteration_cache_footprint." Process 635 is described in further detail later with reference to FIG. 7.

A determination is made as to whether data cache line reuse is possible across loop iterations, depending on the data cache lines fetched in one iteration, and the set associativity constraints (step 615). The determination made, using process 640, referred to as "conflict_miss_analysis," is further described later in reference to FIG. 8. A cache conflict miss occurs when a total number of references mapped to the same cache set is greater than the set associativity.

For all memory accesses in the loop, a data cache line reuse analysis is performed to compute the total number of data cache lines required by the loop (step 620). Depending on the cache constraints, process 645 cache_reuse_analysis is used to estimate whether one memory reference can reuse the data cache line used by the other memory reference, for every pair of memory reference in the loop. Process 645 is further described later in reference to FIG. 9.

Given all the memory references which result in a cache miss, an estimate of the total cache misses for all the iterations of the given loop is computed using process 650 loop_cache_footprint (step 625). Process 650 is further described later in reference to FIG. 10.

After estimating the total number of cache misses for the given loop in step 625, process 600 returns to step 610 to process for the next outer loop 630 in the loop nest. Given a memory reference in the inner loop, the total number of cache misses for a single iteration of the outer loop is equal to the total number of cache misses for the entire inner loop.

Figure 7:
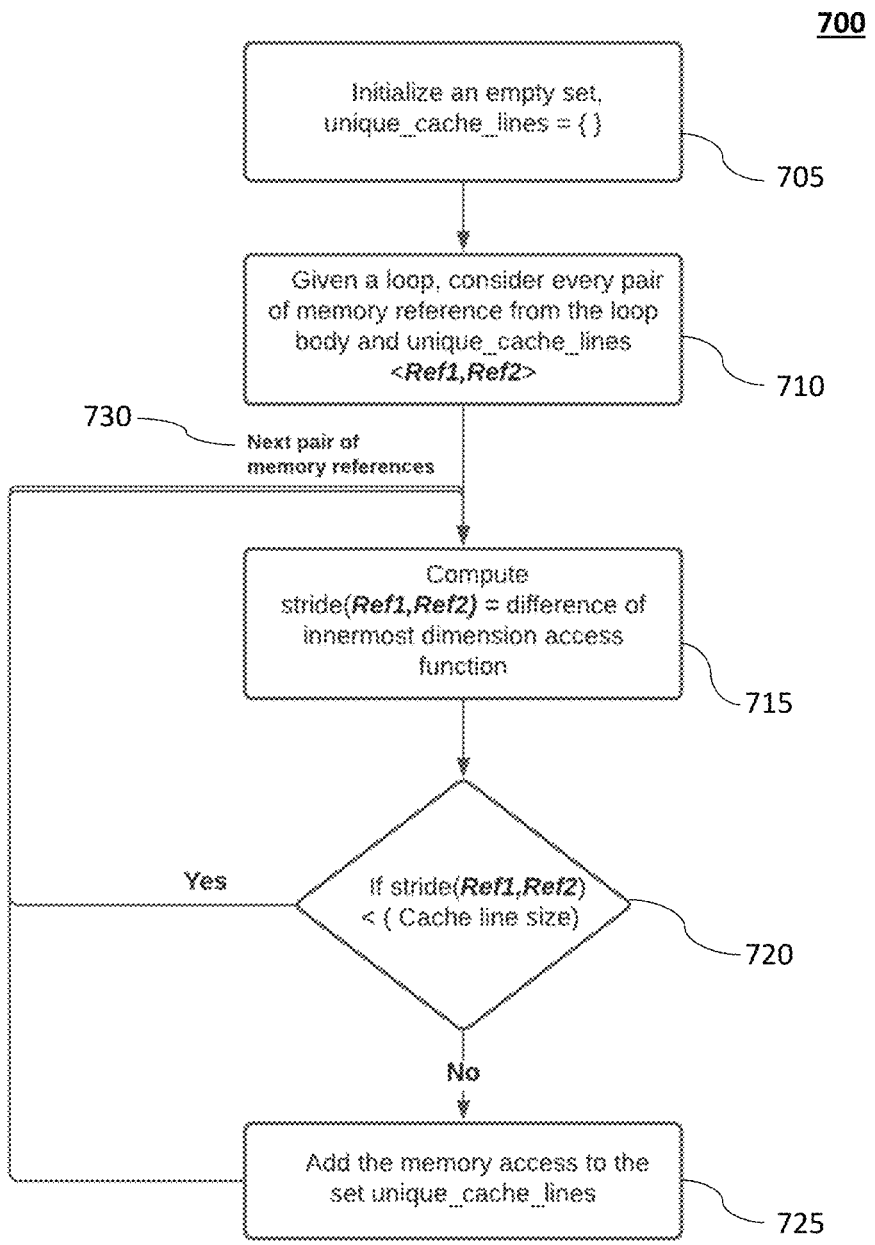
FIG. 7 is a flow diagram of a process for one iteration_cache_footprint used in process 600 of FIG. 6 in an embodiment of the disclosure.

FIG. 7 is a flow diagram of the process named one_iteration_cache_footprint in an embodiment of the disclosure. Process 700 receives a loop as input and estimates the total L1 data cache misses for one iteration of the loop. Process 700 initializes an empty set, unique_cache_lines (step 705). This set is used to stores all memory references in the loop which fetch a unique data cache line. On completion of the analysis, the size of this set is the total number of cache misses incurred to execute one iteration of the given loop. Process 700 assumes that a single iteration of the loop fits in the data cache. Hence, a data cache line fetched during the execution of an iteration of the loop is assumed to not be evicted during the execution of the same iteration.

Given a loop, consider every pair of memory references <Ref1, Ref2>, where Ref1 is a memory reference in the loop and Ref2 is a memory reference from the set "unique_cache_lines" (step 710). Initially, when the set "unique_cache_lines" is empty, the first memory reference Ref1 in the loop is added to it. Subsequently, in the following steps of the analysis, Ref1 is added to the set when it is determined that Ref1 does not reuse one of the data cache lines already fetched by a memory reference Ref2 already in the set.

Steps 715 computes stride (Ref1,Ref2), a metric used to estimate whether memory references Ref1 and Ref2 use the same data cache line. This metric is defined as the difference of the access functions corresponding to the innermost subscript expressions in Ref1 and Ref2, when the two references have the same base pointer, and the same access function for all other subscript expressions. The following is an example formulation to compute this metric.

Any N dimensional array reference Ref has two properties: a base pointer and a sequence of subscript expressions. The base pointer is denoted by, BasePointer(Ref) and the sequence of subscript expressions in the reference is denoted as $f_1(Ref), f_2(Ref), \ldots, f_N(Ref)$, starting from the rightmost to the leftmost subscript expressions (for row major order, similar for column major order). For example, using this notation, Ref: A[i][j+2][k+10] can be expressed as:

BasePointer(Ref)=$A$, $f_1(Ref)=k+10$; $f_2(Ref)=j+2$;
$f_3(Ref)=i$

Then stride (Ref1,Ref2)=$|f_1(Ref1)-f_1(Ref2)|$, if BasePointer(Ref1)==BasePointer(Ref2) && $f_k(Ref1)==f_k(Ref2)$, for all $k \neq 1$, or infinity otherwise. A determination is made whether the stride (Ref1,Ref2) is less than the data cache line size (step 720). When the stride (Ref1,Ref2) is less than the data cache line size, Ref1 can reuse the data cache line fetched by Ref2, and Ref1 can be ignored for the remainder of the analysis. Subsequently process 700 proceeds to the next pair of memory references (step 730). Otherwise, when the stride (Ref1,Ref2) is not less than the data cache line size, Ref1 causes a cache miss and is added to the set unique_cache_lines (step 725). Process 700 then proceeds to the next pair of memory references (step 730) until all pair of memory references in the loop have been processed.

Figure 8:
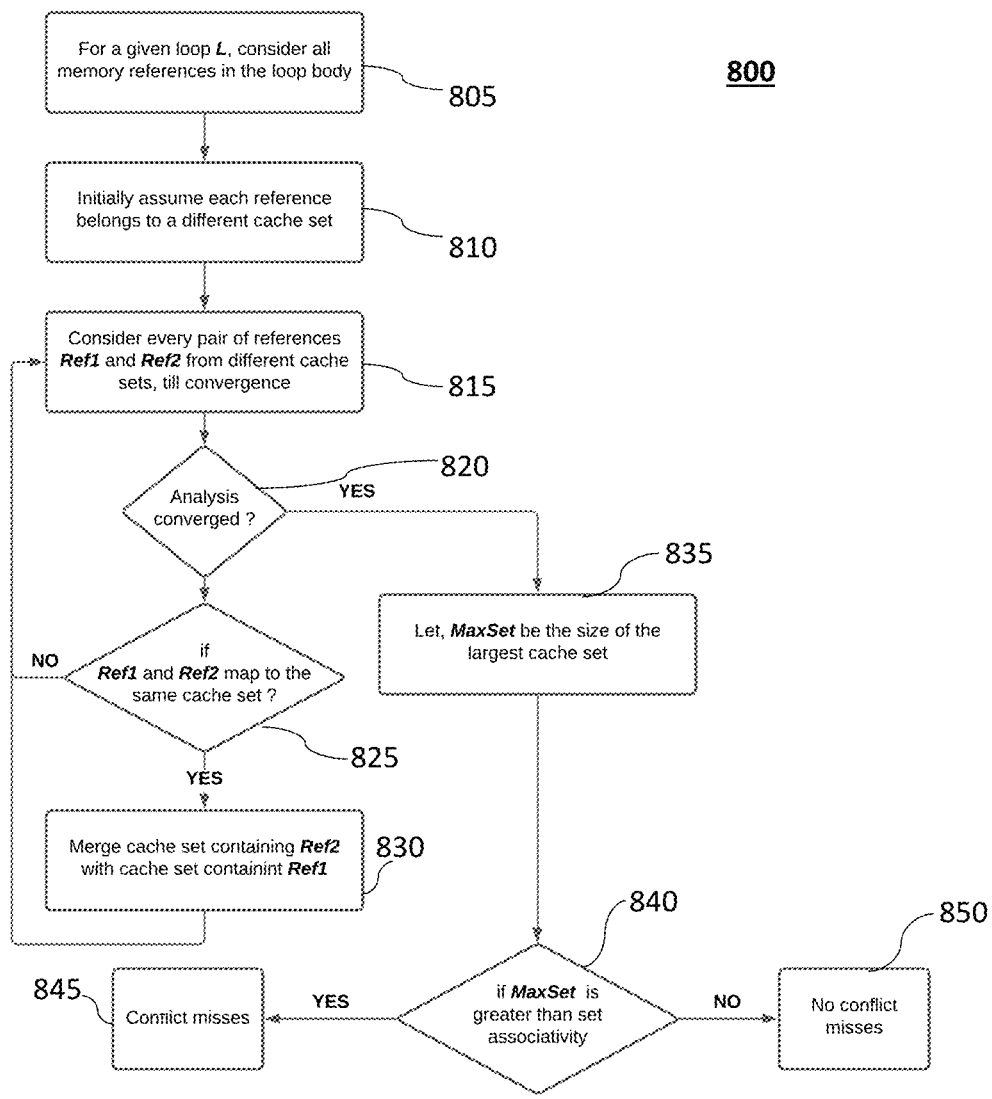
FIG. 8 is a flow diagram of a process for conflict_miss_analysis used in process 600 of FIG. 6 in an embodiment of the disclosure.

FIG. 8 is a flow diagram of the process named conflict_miss_analysis in an embodiment of the disclosure. Process 800 receives a loop as input and determines whether memory references within the loop can result in conflict misses. When the references in a loop can result in conflict misses, then there cannot be any data cache line reuse across loop iterations. Considering a K-way set associative data cache of size N bytes with a data cache line size of B bytes, the total number of data cache lines can be expressed by N/B, and the total number of sets can be expressed as S=(N/B)/K. A typical approach to determine the specific cache set to which a memory address maps, uses the least significant bits of the memory address. Therefore, given a memory address addr, the cache set it maps to can be estimated as (addr/B)% S.

Process 800 considers all memory references in the loop body for a given loop (step 805). Initially each memory reference is assumed to map to a unique set (step 810). As process 800 iterates, these sets are merged, such that references that map to the same data cache set are assigned to the same set.

Every pair of references Ref1 and Ref2 from different sets are considered until convergence (step 815). A determination is made as to whether the analysis has converged (step 820). The analysis has converged when there is no change after iterating over all the unique sets once.

In response to a determination that the analysis has not converged, process 800 determines whether Ref1 and Ref2 map to the same cache set (825). The process assumes that every array has a unique base address. When Ref1 and Ref2 access the same array, they have the same base address and the relative difference between the indices can be used to determine if they access the same cache line. For example, the symbolic base address for an array A can be assumed to be x. Then, the address for A[1] is (x+4), and so on. Without loss of generality, the base address of an array reference is assumed to map to cache set 0, and therefore the offset from the base address is used to determine the corresponding cache set for that reference. Thus, given two references to the same array, if the offset from the base address is known statically, then process 800 can determine whether they map to the same cache set. It is assumed the address of a memory reference is aligned to data cache line boundaries.

In response to a determination that Ref1 and Ref2 do not map or belong to the same cache set, process 800 returns to step 815. Otherwise, in response to a determination that Ref1 and Ref2 map or belong to the same cache set, process 800 merges the set corresponding to Ref2 with the set corresponding to Ref1 (830). Process 800 then returns to step (815).

In response to a determination the analysis has converged, process 800 determines the size of the cache set containing the largest number of memory references and initializes MaxSet to be its size (step 835). A determination is made as to whether MaxSet is greater than the data cache set associativity (step 840). In response to a determination that MaxSet is greater than the data cache set associativity, then the references in the loop body will incur conflict misses, and process 800 indicates a cache miss and disables any inter-iteration reuse process (step 845). Otherwise, in response to a determination that MaxSet is not greater than the data cache set associativity, process 800 indicates no conflict misses (step 850).

Figure 9:
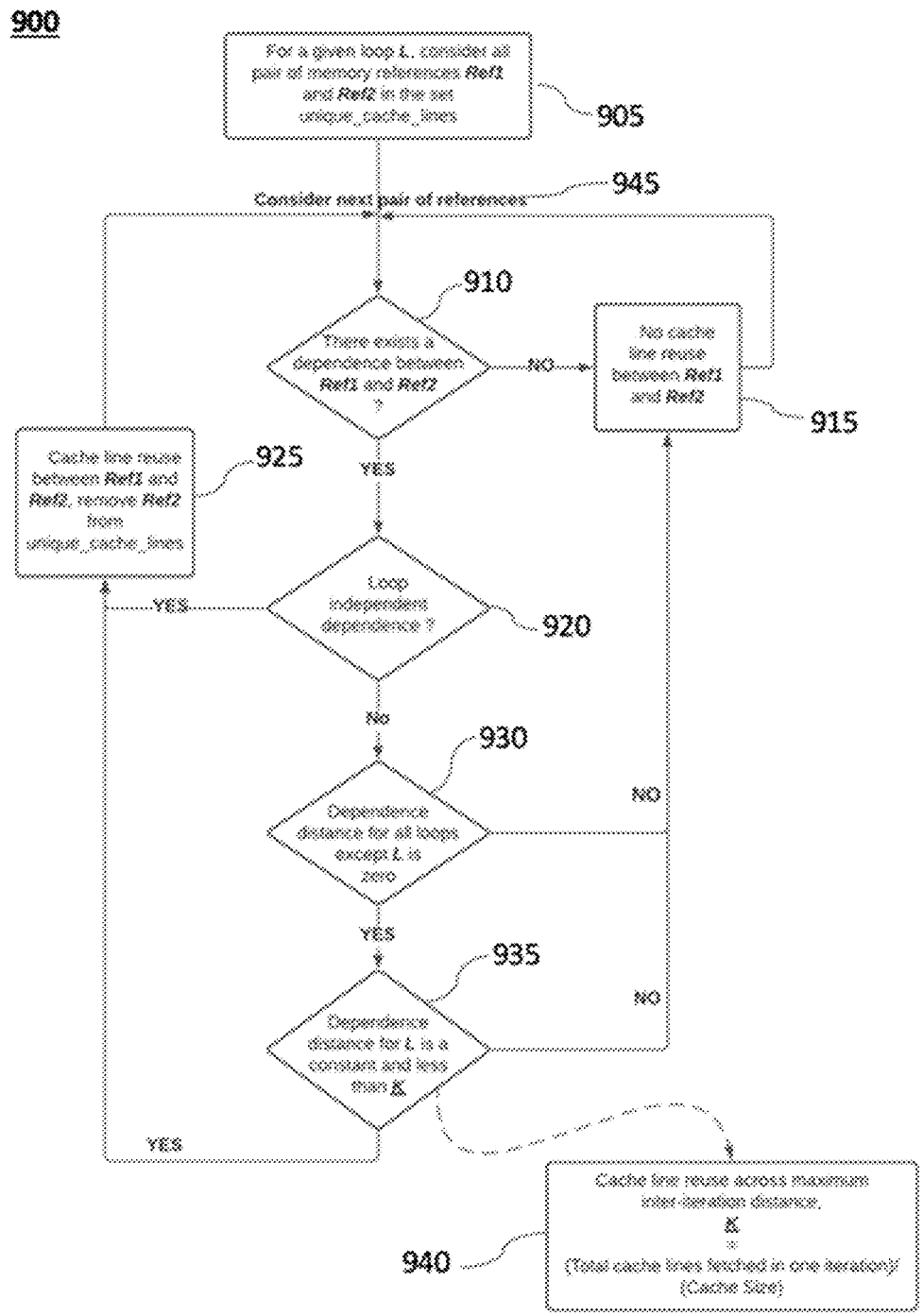
FIG. 9 is a flow diagram of a process for cache_reuse_analysis used in process 600 of FIG. 6 in an embodiment of the disclosure.

FIG. 9 is a flow diagram of the process named cache_reuse_analysis in an embodiment of the disclosure. Process 900 receives a loop (denoted by L) as input and generates output in the form of a set of memory references that fetch unique data cache lines during the execution of the loop. Process 900 considers all pair of memory references in the loop and determines whether there is any data cache line reuse across iterations of the loop. Process 900 begins with the unique_cache_lines set computed by one_iteration_cache_footprint of process 700 of FIG. 7.

Given a loop L, and unique_cache_lines populated with the references that fetch a unique data cache line when executing an iteration of L, consider all pair of memory references Ref1 and Ref2 in the set unique_cache_lines (step 905). An attempt to determine the dependence distance between Ref1 and Ref2 is made (step 910). When there is no dependence between Ref1 and Ref2, then process 900 estimates that there is no data cache line reuse (915). Otherwise, when there is a dependence distance between Ref1 and Ref2, process 900 determines whether the dependence is loop independent (step 920).

In response to a determination that the dependence is loop independent in step 920, both references Ref1 and Ref2 access the same data cache line and one of the references, in this example Ref2, is removed from the set unique_cache_lines (step 925). Following which a next pair of references is considered (step 945).

Given the loop dependence distance between references Ref1 and Ref2, a determination is made whether the distance is zero for all loops enclosing the references except L (step 930). In response to a determination that the distance is not zero for all loops enclosing the references except L, process 900 loops back to perform step 915. Otherwise, in response to a determination that the distance is zero for all loops enclosing the references except L, there is a possibility of data cache line reuse across iterations of L. A determination is made as to whether the dependence distance for L is constant and less than a constant K (step 935).

The constant K is the maximum distance across which data cache line reuse is possible and is computed as: K=(Total data cache lines fetched in one iteration)/(Cache Size). The Cache Size is considered, in this context, to be equal to the maximum number of cache lines that fit in the data cache. In this example, the total data cache lines fetched in one iteration of the loop L, refers to the total data cache lines fetched by the entire execution of its immediate children loops (step 940).

In response to a determination that the dependence distance for L is constant and less than K, process 900 proceeds to step 925. Otherwise process 900 proceeds to step 915. This is because when there is a strictly positive constant dependence distance carried by loop L, it must be small enough such that the data cache line fetched by Ref1 is not evicted by the time Ref2 accesses the same data cache line (or vice versa).

The following set of equations are used in process 900:

A
$$\text{stride}(Ref, L_d) = \begin{cases} f_1(j + step_j) - f_1, & \text{if only } f_1 \text{ is a function of } j \\ CLS, & \text{otherwise} \end{cases}$$

B $\quad$ Consecutive(Ref, $L_d$) = (stride(Ref, $L_d$) < CLS)

C
$$RefCost_{intra}(Ref, L_d) = \begin{cases} 1, & \text{if } L_d \text{ is inner-most loop} \\ RefCost(Ref, L_{d+1}), & \text{otherwise} \end{cases}$$

D $\quad$ RefCost(Ref, $L_d$) =
$$\begin{cases} RefCost_{intra}(Ref, L_d), & \text{if } LoopInvariant(Ref, L_d) \\ \dfrac{trip * stride(Ref, L_d)}{CLS} *, & \text{if } Consecutive(Ref, L_d) \\ RefCost_{intra}(Ref, L_d), & \\ trip * RefCost_{intra}(Ref, L_d), & \text{otherwise} \end{cases}$$

Equation B defines a boolean property to determine whether memory references Ref issued by consecutive iterations of a loop $L_d$, a loop at depth d in the loop nest, use the same cache line. Two references use the same cache line if the stride across consecutive iterations of the loop $L_d$ is less than the cache line size (CLS). The stride can be computed using equation A which defines the stride for a reference Ref across consecutive iterations of loop $L_d$. Let's assume loop $L_{d\ has}$ a loop index denoted by j and a step increment denoted by $step_j$, then in equation A, $f_1$ denotes the innermost subscript for Ref. A constant stride can be computed when only the innermost subscript is a function of the index j, if any other subscripts depend on j, then the stride is initialized to CLS, to ensure the equation B is false.

Equation C is used to estimate the total number of cache lines fetched by a reference Ref in one iteration of loop $L_d$. There are two cases, if $L_d$ is the innermost loop the cost is 1, otherwise the cost is equal to the cost for that reference in loop $L_{d+1}$.

Finally, equation D is used to compute the total number of cache lines fetched by reference Ref over the entire loop $L_d$. There are three cases. If the Ref is loop invariant with respect to $L_d$, the cost is equal to the cost of a single iteration as estimated by equation C. Otherwise, if reference Ref uses the same cache line in consecutive iterations of $L_d$, as determined by equation B, the cost is equal to the loop trip count for $L_d$ multiplied by the stride of that reference as computed by equation A and then divided by the cache line size CLS. The result is further multiplied by the reference cost for one iteration of that loop as determined by equation C. Finally, if the static analysis cannot prove that there is cache line reuse for Ref or that the reference is loop invariant in $L_d$, then each iteration of $L_d$ might fetch a unique cache line, so the reference cost is equal to the loop trip count multiplied by the reference cost in one iteration of the loop as determined by equation C.

Figure 10:
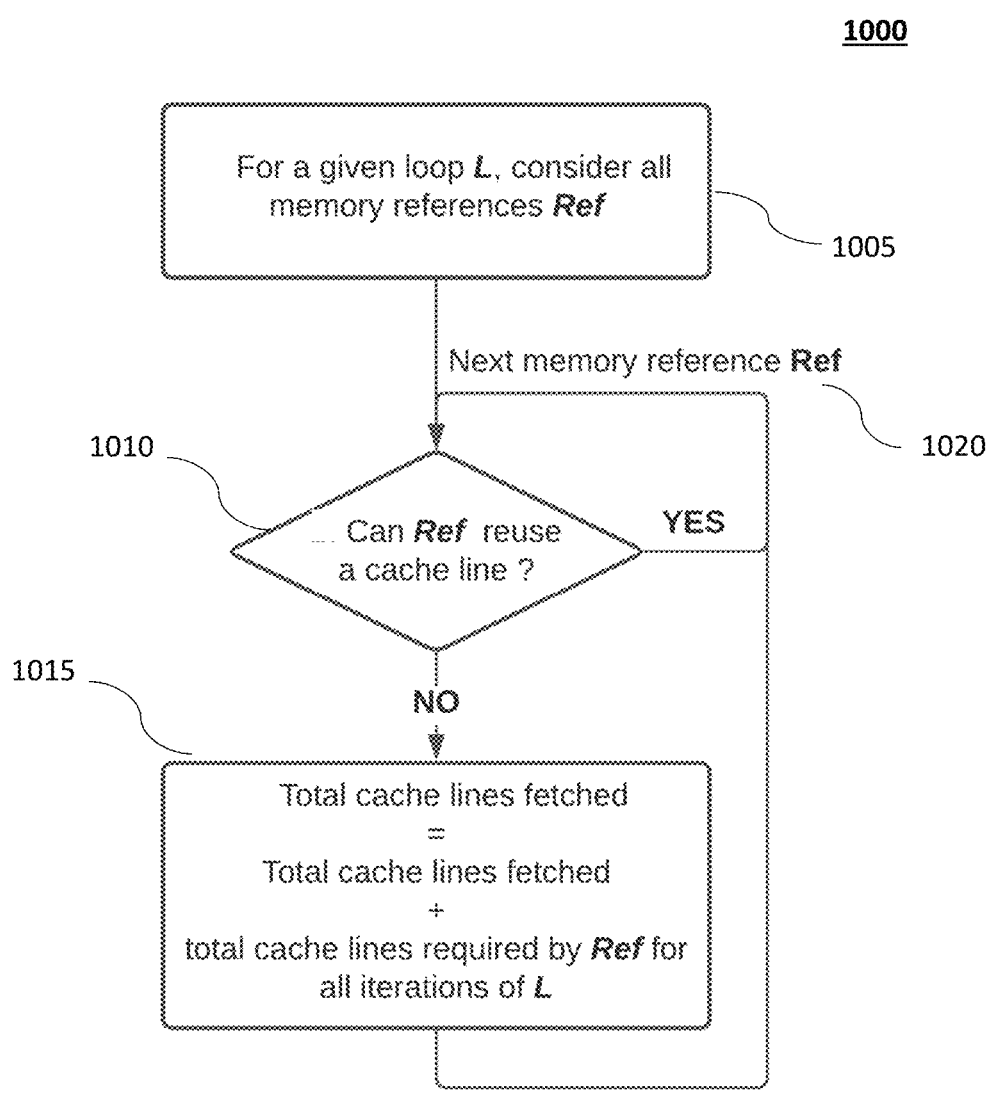
FIG. 10 is a flow diagram of a process for loop_cache_footprint used in process 600 of FIG. 6 in an embodiment of the disclosure.

FIG. 10 is a flow diagram of an overview of a loop_cache_footprint process in an embodiment of the disclosure. Process 1000 is an overview of a data cache cost estimation process in an embodiment of the disclosure. Process 1000 receives a loop as input and generates the number of estimated total cache misses incurred for executing all iterations of the loop.

Given a loop L, process 1000 considers all memory references in the loop body (step 1005). A determination is made as to whether a reference Ref can reuse a data cache line used by a previous iteration of the loop (step 1010). In response to the determination that Ref can reuse a data cache line, process 1000 fetches the next memory reference in the loop (step 1020).

In response to a determination that Ref cannot reuse a data cache line, process 1000 increments the total number of data cache lines required by L by the estimated total number of data cache lines fetched by loop L for Ref (step 1015). It may be noted that process 900 of FIG. 9 may be used to estimate the total number of cache lines required by a memory reference across loop iterations. Process 1000 continues to iterate over the remainder of the references from the loop body by returning to step 1020.

The following equation is used in process 1000:

E
$$LoopFoorprint(L_d) = \sum_{k=1}^{m}(RefCost(Ref_k, L_d))$$

Process 1000 uses equation E to determine LoopFoorprint ($L_d$) which is the total number of cache lines fetched by loop $L_d$. RefCost in equation E is obtained from equation D. In equation E the value m refers to the number of memory references in loop $L_d$.

Figure 11A:
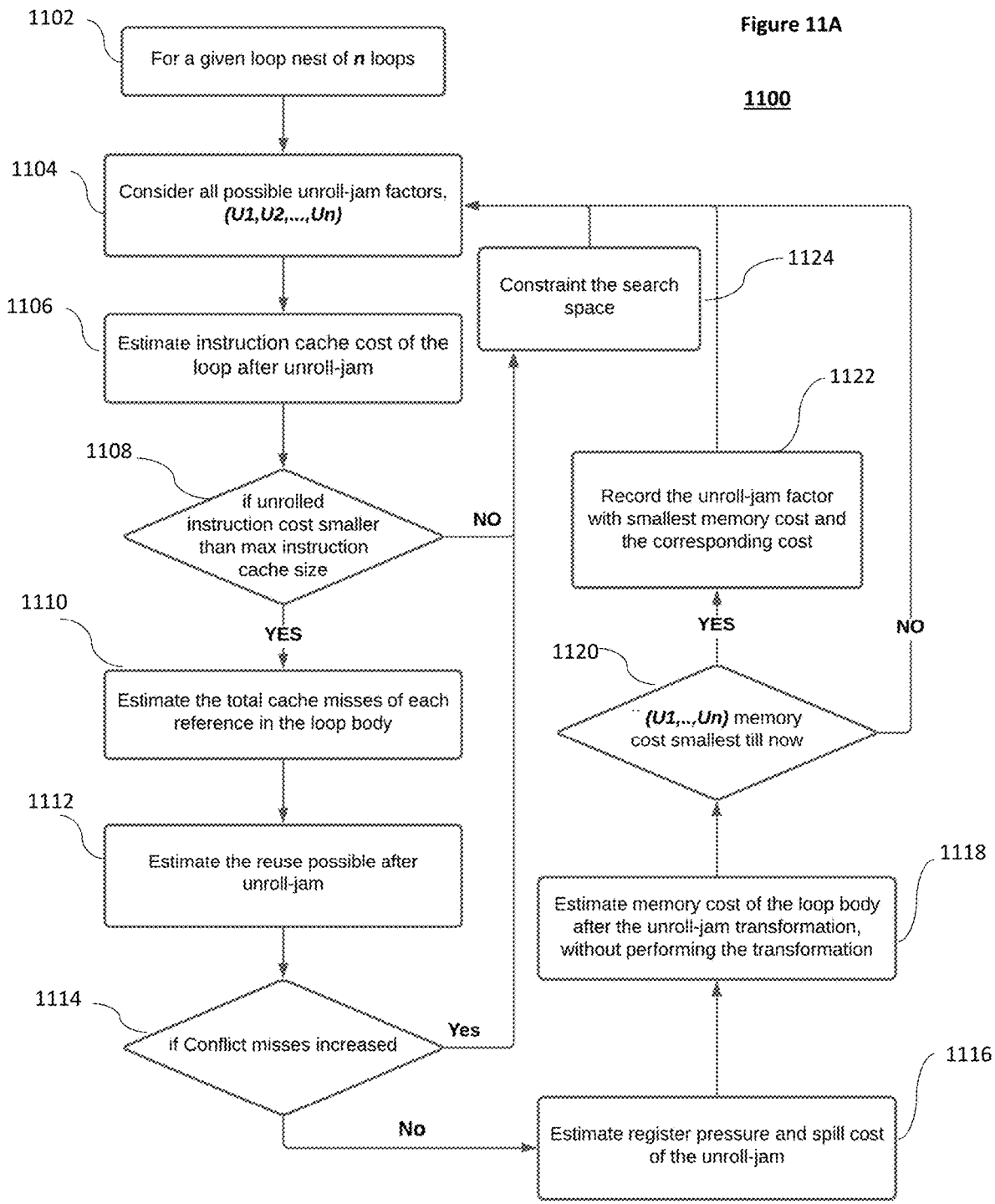
FIG. 11A is flow diagram of a process for estimating optimal unroll-and-jam factors in an embodiment of the disclosure.

FIG. 11A is a flow diagram of a process for estimating optimal unroll-and-jam factors in an embodiment of the disclosure. Process 1100 receives a loop nest as input and generates a set of unroll factors for the loop nest which minimizes the overall cache misses in the nest.

Given a loop nest containing n loops (step 1102), process 1100 considers all possible unroll factors ($U_1, U_2, \ldots, U_n$) for the n loops in the loop nest (step 1104). Process 1100 estimates the instruction cache cost, in terms of cache size, for a loop body if the loop was unroll-and-jammed by the given unroll factors, without performing the transformation (step 1106).

A determination is made as to whether the instruction cache cost estimated, in terms of cache size is smaller than a maximum instruction cache size available (step 1108). In response to a determination the estimated instruction cache size is not smaller than a maximum instruction cache size available, the current unroll factors are ignored, and the search space for unroll-and-jam factors is constrained by ignoring factors that are greater than the current ones to constrain a search space (step 1124), then process 1100 returns to step 1104. Otherwise, in response to a determination the estimated instruction cache size is smaller than a maximum instruction cache size available, process 1100 estimates the total number of cache misses for each reference in the loop body by using the process 600 in FIG. 6 (step 1110).

The following set of equations are used in process 1100:

F
$$CopiesReq(Ref, \{U_1, U_2, \ldots, U_n\}) = (d_1 * U_2 * \ldots * U_n) + (U_1 * d_2 * \ldots * U_n) + \ldots + (U_1 * U_2 * \ldots * d_n) - (d_1 * d_2 * \ldots * d_n)$$

G
$$LoopFootprint(L_d, \{U_1, U_2, \ldots, U_n\}) = \sum_{k=1}^{m}(RefCost(Ref_k,$$
$$L_d * CopiesReq(Ref, \{U_1, U_2, \ldots, U_n\})) + TotalRegisterSpills$$

Equation F denotes the total number of unique memory references of Ref that is required after the loop unroll-and-jam transformation by factors ($U_1, U_2, \ldots, U_n$), where ($d_1, d_2, \ldots, d_n$) represents Ref's dependence distance vector. Step 1112 uses equation F to estimate memory reuse possible after the loop unroll and jam transformation, if we consider possible scalar reuse and data cache line reuse from the unrolled copies. The following table illustrates an example of the possible reuse after the loop unroll and jam transformation.

| Reuse Exposed by Unroll and Jam Transformation | | | |
|---|---|---|---|
| Scalar Reuse | | Cache Line reuse | |
| 1‖ | //Before Unroll-Jam | 1‖ | //Before Unroll - Jam |
| 2‖ | for (i) | 2‖ | for (i) |
| 3‖ | for (j) | 3‖ | for (i) |
| 4‖ | x = A [i] [j] | 4‖ | x = A [j ] [i] |
| 5‖ | y = A [i − 1] [j] | | |
| 1‖ | //After Unroll-Jam (2,1) | | |
| 2‖ | for (i) | 1‖ | //After Unroll-Jam (2,1) |
| 3‖ | for (j) | 2‖ | for (i) |
| 4‖ | x1 = A [i] [j] | 3‖ | for (j) |
| 5‖ | y1 = A [i − 1] [j] | 4‖ | x1 = A [j] [i] |
| 6‖ | x2 = A [i + 1] [j] | 5‖ | x2 = A [ j ] [i + 1] |
| 7‖ | y2 = A [i] [j] | 6‖ | // x2 can reuse the |
| 8‖ | // y2 can reuse x1 | 7‖ | // cache line for x1 |

Step 640 in FIG. 6 conflict_miss_analysis estimated the number of conflict misses for each memory reference, and step 1112 in FIG. 11A estimated memory reuse possible after the loop unroll and jam transformation by using equation F. The total number of conflict misses is the sum of conflict misses of each memory reference multiplied by its corresponding number of copies needed. A determination is made as to whether the estimated number of conflict misses increased from the previously recorded ones (step 1114). In response to a determination the estimated number of conflict misses is increased, the current unroll and jam factors are ignored, and the search space for unroll-and-jam factors is constrained by ignoring factors that are greater than the current ones (step 1124). Otherwise, process 1100 continues to step 1116.

Given the unroll and jam factors, estimate the register pressure and total spills after the loop unroll-and-jam transformation by the given unroll factors, without performing the transformation (step 1116). This step estimates how many copies of each type of registers would be required after the loop unroll-and-jam transformation and considers possible register reuse based on the unroll factors.

Equation G denotes the total memory cost of the loop body after the loop unroll-and-jam transformation by the given factor, by considering CopiesReq (the copies of each reference estimated at step 1112 with equation F), RefCost (the reference cost estimated at step 1110 with equation D), and TotalRegisterSpills (estimated at step 1116). Process 1100 estimates the memory cost LoopFootprint of the given set of unroll factors by using equation G (step 1118).

Determine whether the memory cost corresponding to a set of unroll factors $(U_1, U_2, \ldots, U_n)$ is smaller than the current cost (smallest until now) (step 1120). If the current cost does not yet exist, then it is initialized to be equal to the cost computed in step 1118. In response to a determination that the memory cost corresponding to unroll factors $(U_1, U_2, \ldots, U_n)$ is not smaller than or equal to the current cost, return to step 1104 and consider the next set of unroll factors. Otherwise record the set of unroll factors $(U_1, U_2, \ldots, U_n)$ and the current cost to be equal to the value computed in step 1118 (step 1122) and continue the search for the optimal unroll-and-jam factors by returning to step 1104.

Figure 11B:
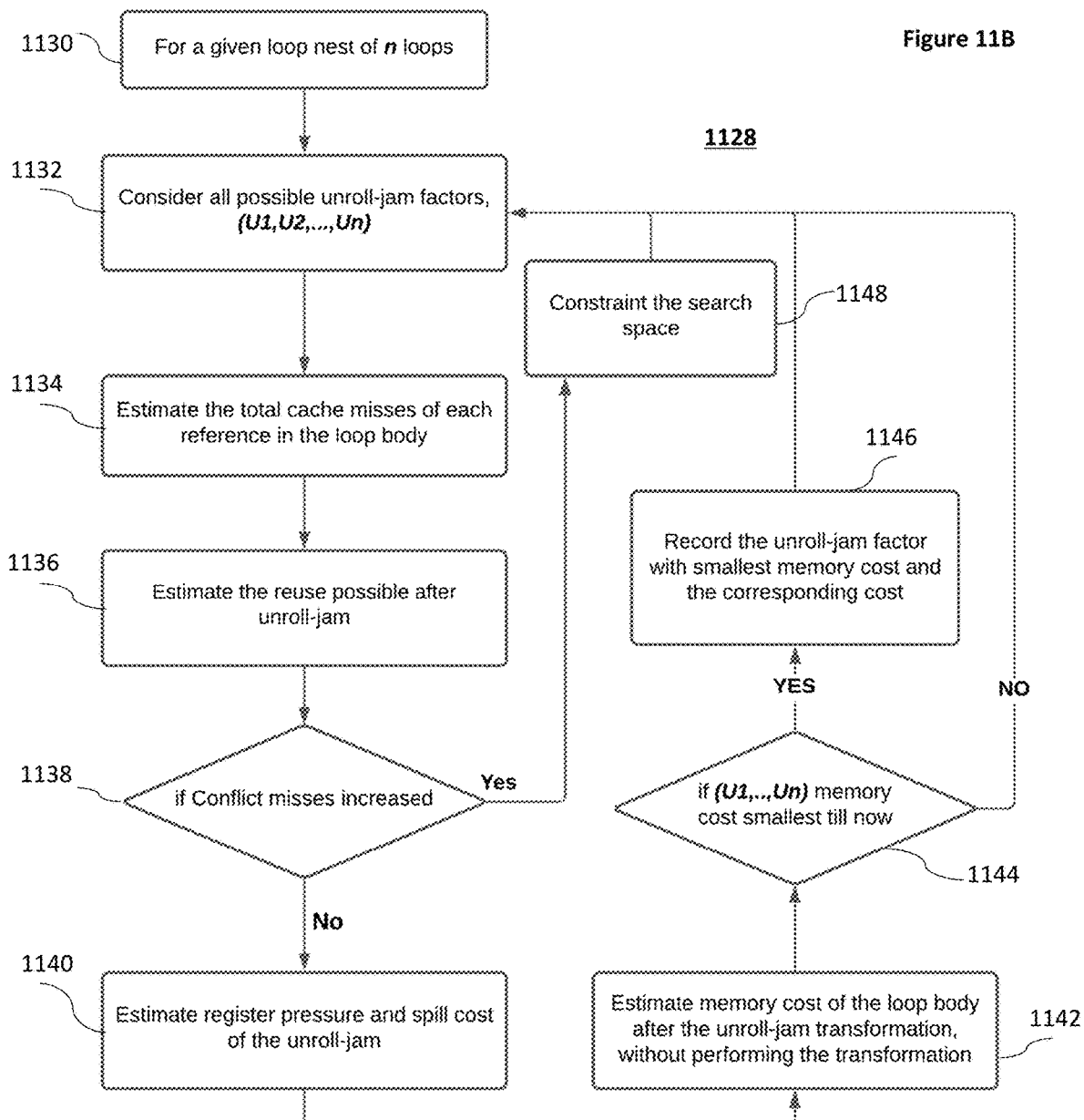
FIG. 11B is flow diagram of a process for estimating optimal unroll-and-jam factors, without considering the instruction cache cost as a limiting factor, in another embodiment of the disclosure.

FIG. 11B is flow diagram of a process for estimating optimal unroll-and-jam factors in an alternative embodiment of the disclosure. Process 1128 is an alternative to process 1100 of FIG. 11A, without considering the instruction cache cost as a limiting factor.

Given a loop nest containing n loops (step 1130), process 1128 considers all possible unroll factors for the n loops in the loop nest, $(U_1, U_2, \ldots, U_n)$ (step 1132). Process 1128 estimates the total number of cache misses for each reference in the loop using the process 600 in FIG. 6 (step 1134).

Step 1136 uses equation F to estimate memory reuse possible after the loop unroll and jam transformation considering possible scalar reuse and data cache line reuse from the unrolled copies. A determination is made as to whether the estimated number of conflict misses increased from the previously recorded ones (step 1138). In response to a determination the estimated number of conflict misses is increased, the current unroll and jam factors are ignored, and the search space for unroll-and-jam factors is constrained by ignoring factors that are greater than the current ones (step 1148). Otherwise, process 1128 continues to step 1140.

Given the unroll and jam factors, estimate the register pressure and total spill after the loop unroll-and-jam transformation by the given unroll factors, without performing the transformation (step 1140). This step estimates how many copies of each type of registers would be required after the loop unroll-and-jam transformation and considers possible register reuse based on the unroll factors.

Process 1128 estimates the memory cost LoopFootprint of the given set of unroll factors by using equation G (step 1142). Determine whether the memory cost corresponding to a set of unroll factors $(U_1, U_2, \ldots, U_n)$ is a smallest cost until now (step 1144). If the current cost does not yet exist, then it is initialized to be equal to the cost computed in step 1142. In response to a determination that the memory cost corresponding to unroll factors $(U_1, U_2, \ldots, U_n)$ is not smaller than or equal to the current cost, (smallest until now) return to step 1132 and consider the next set of unroll factors. Otherwise record the set of unroll factors $(U_1, U_2, \ldots, U_n)$ and the current cost to be equal to the value computed in step 1142 (step 1146) and continue the search for the optimal unroll-and-jam factors by returning to step 1132.

Figure 11C:
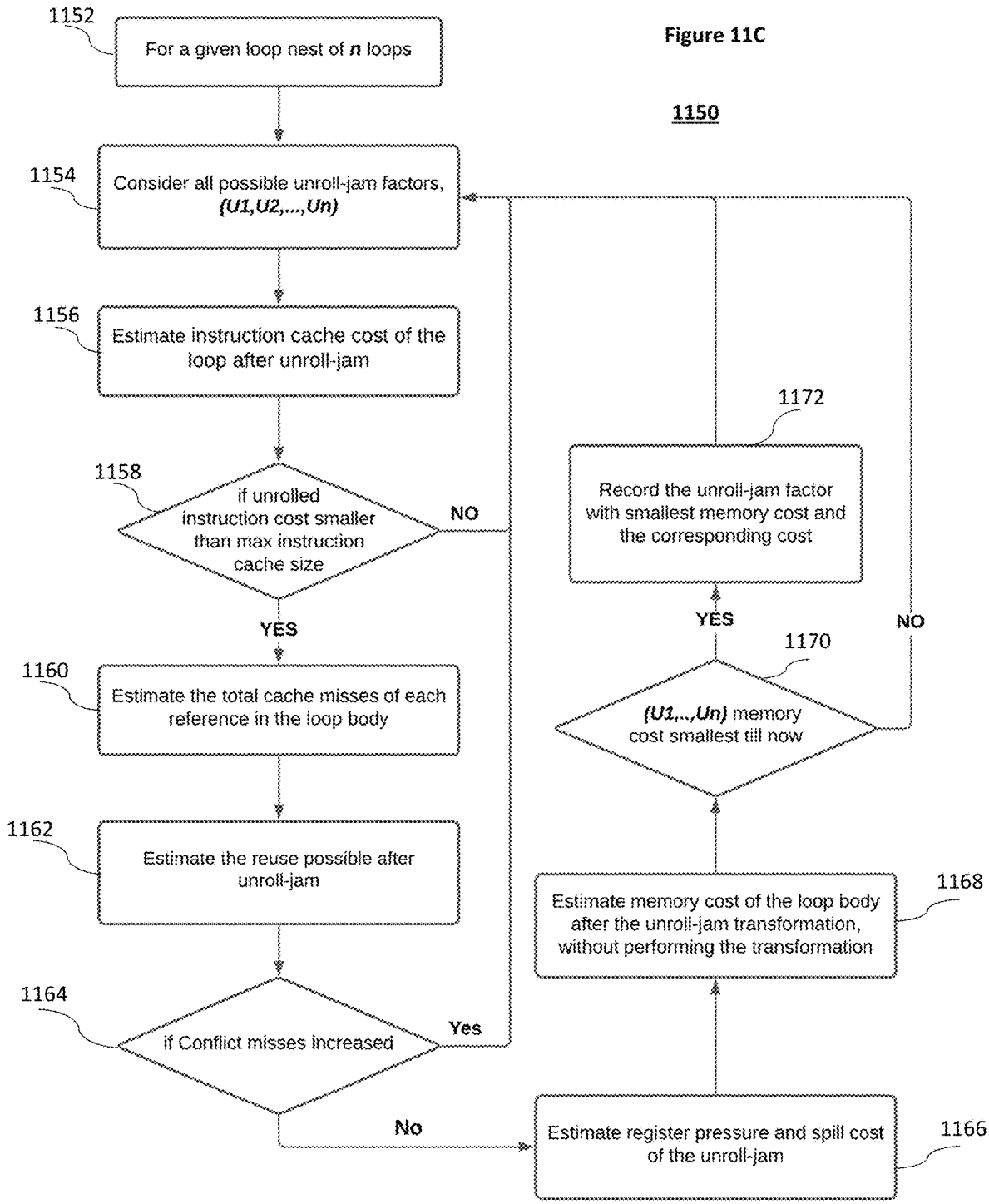
FIG. 11C is flow diagram of a process for estimating optimal unroll-and-jam factors, where the search space for the unroll factors is not constrained while searching the optimal unroll and jam factor, in another embodiment of the disclosure.

FIG. 11C is a flow diagram of a process for estimating optimal unroll-and-jam factors in an alternative embodiment of the disclosure. Process 1150 is an alternative to process 1100 of FIG. 11A, in which the search space for the unroll factors is not constrained while searching the optimal unroll and jam factor.

Given a loop nest containing n loops (step 1152), process 1150 considers all possible unroll factors for the n loops in the loop nest, $(U_1, U_2, \ldots, U_n)$ (step 1154). Process 1150 estimates the cost, in terms of instruction cache size, the loop nest would have if it was unroll-and-jammed by the given unroll factors, without performing the transformation (step 1156).

A determination is made as to whether the estimated instruction cache cost, (an unrolled instruction cost) is smaller than a maximum instruction cache size (step 1158). In response to a determination the estimated instruction cache cost is not smaller than a maximum instruction cache size, the current unroll factors are ignored, and returns to step 1154. Otherwise, in response to a determination the estimated instruction cache size is smaller than a maximum instruction cache size, process 1150 estimates the total number of cache misses for each reference in the loop body using the process 600 in FIG. 6 (step 1160).

Process 1150 uses equation F to estimate memory reuse possible after the loop unroll and jam transformation, if we consider possible scalar reuse and data cache line reuse from the unrolled copies.

A determination is made as to whether the estimated number of conflict misses increased from the previously recorded ones (step 1164). In response to a determination the estimated number of conflict misses is increased, the current unroll and jam factors are ignored, and returns to step 1154. Otherwise, process 1150 continues to step 1166.

Given the unroll and jam factors, estimate the register pressure and total spills after the loop unroll-and-jam transformation by the given unroll factors, without performing the transformation (step 1166). This step estimates how many copies of each type of registers would be required after the loop unroll-and-jam transformation and considers possible register reuse based on the unroll factors.

Process 1150 estimates the memory cost LoopFootprint of the given set of unroll factors by using equation G (step 1168). Determine whether the memory cost corresponding to a set of unroll factors $(U_1, U_2, \ldots, U_n)$ is smaller than the current cost (smallest until now) (step 1170). If the current cost does not yet exist, then it is initialized to be equal to the cost computed in step 1168. In response to a determination that the memory cost corresponding to unroll factors $(U_1, U_2, \ldots, U_n)$ is not smaller than or equal to the current cost, return to step 1154 and consider the next set of unroll factors. Otherwise record the unroll-and-jam factor with the smallest memory cost and corresponding memory cost (step 1172) and continue the search for the optimal unroll-and-jam factors by returning to step 1154.

Figure 12:
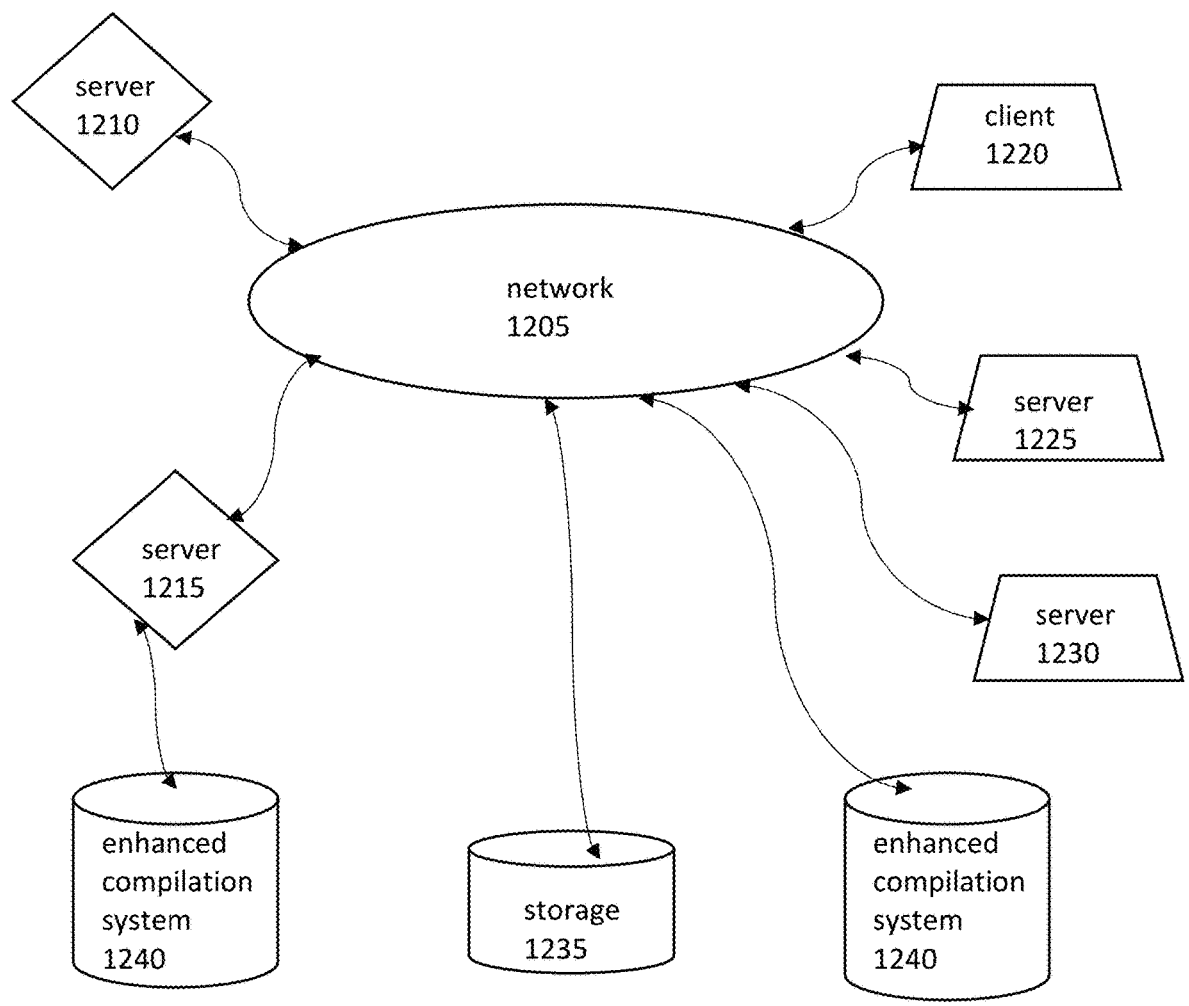
FIG. 12 is a pictorial representation of a network of data processing systems in which illustrative embodiments of the disclosure may be implemented.

With reference now to FIGS. 12 and 13 these figures are only exemplary and are not intended to assert or imply any limitation with regard to the environments in which different embodiments may be implemented. Many modifications to the depicted environments may be made.

FIG. 12 is a pictorial representation of a network of data processing systems in which illustrative embodiments of the disclosure may be implemented. Network data processing system 1200 is a network of computers in which the illustrative embodiments may be implemented. Network data processing system 1200 contains network 1205, which is the medium used to provide communications links between various devices and computers connected together within network data processing system 1200. Network 1205 may include connections, such as wire, wireless communication links, or fiber optic cables.

In the depicted example, server 1210 and server 1215 connect to network 1205 along with storage unit 1235. In addition, clients 1220, 1225, and 1230 connect to network 1205. Clients 1220, 1225, and 1230 may be, for example, personal computers or network computers. In the depicted example, server 1215 provides data, such as boot files, operating system images, enhanced compilation system 1240 and applications to clients 1220, 1225, and 1230. Clients 1220, 1225, and 1230 are clients to server 1210 in this example. In addition, enhanced compilation system 1240, including a process of modeling of data cache set-associative for different unroll factors and consideration of register spills to infer a best unroll-and-jam configuration of FIG. 6, may also be directly accessed using network 1205. Network data processing system 1200 may include additional servers, clients, and other devices not shown.

In the depicted example, network data processing system 1200 is the Internet with network 1205 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 1200 also may be implemented as a number of different types of networks, for example, an intranet, a local area network (LAN), or a wide area network (WAN). FIG. 12 is intended as an example, and not as an architectural limitation for the different illustrative embodiments.

FIG. 13 is a block diagram of an exemplary data processing system operable for various embodiments of the disclosure. In this illustrative example, data processing system 1300 includes communications fabric in a form of bus 1360, which provides communications between processor unit 1305, memory 1310, persistent storage 1315, communications unit 1320, input/output (I/O) unit 1325, display 1330 and enhanced compilation system 1335. Enhanced compilation system 1335 is a variant of enhanced compilation system 1240 of FIG. 12.

Processor unit 1305 serves to execute instructions for software that may be loaded into memory 1310. Processor unit 1305 may be a set of one or more processors or may be a multi-processor core, depending on the particular implementation. Further, processor unit 1305 may be implemented using one or more heterogeneous processor systems in which a main processor is present with secondary processors on a single chip. As another illustrative example, processor unit 1305 may be a symmetric multi-processor system containing multiple processors of the same type.

Memory 1310 and persistent storage 1315 are examples of storage devices 1340. A storage device is any piece of hardware that is capable of storing information, such as, for example without limitation, data, program code in functional form, and/or other suitable information either on a temporary basis and/or a permanent basis. Memory 1310, in these examples, may be, for example, a random-access memory or any other suitable volatile or non-volatile storage device. Persistent storage 1315 may take various forms depending on the particular implementation. For example, persistent storage 1315 may contain one or more components or devices. For example, persistent storage 1315 may be a hard drive, a flash memory, a rewritable optical disk, a rewritable magnetic tape, or some combination of the above. The media used by persistent storage 1315 also may be removable. For example, a removable hard drive may be used for persistent storage 1315. In another example, enhanced compilation system 1335, including the process of modeling of data cache set-associative for different unroll factors and consideration of register spills to infer a best unroll-and-jam configuration of FIG. 6, may also be contained within memory 1310 or persistent storage 1315.

Communications unit 1320, in these examples, provides for communications with other data processing systems or devices. In these examples, communications unit 1320 is a network interface card. Communications unit 1320 may provide communications through the use of either or both physical and wireless communications links.

Input/output unit 1325 allows for input and output of data with other devices that may be connected to data processing system 1300. For example, input/output unit 1325 may provide a connection for user input through a keyboard, a mouse, and/or some other suitable input device. Further, input/output unit 1325 may send output to a printer. Display 1330 provides a mechanism to display information to a user using a graphical user interface or a nongraphical interface.

Instructions for the operating system, applications and/or programs may be located in storage devices 1340, which are in communication with processor unit 1305 through communications fabric of bus 1360. In these illustrative examples the instructions are in a functional form on persistent storage 1315. These instructions may be loaded into memory 1310 for execution by processor unit 1305. The processes of the different embodiments may be performed by processor unit 1305 using computer-implemented instructions, which may be located in a memory, such as memory 1310.

These instructions are referred to as instructions, program instructions, program code, computer usable program code, or computer readable program code that may be read and executed by a processor in processor unit 1305. The program code in the different embodiments may be embodied on different physical or tangible computer readable storage media, such as memory 1310 or persistent storage 1315.

Program code 1350 is located in a functional form on computer readable storage media 1345 that is selectively removable and may be loaded onto or transferred to data processing system 1300 for execution by processor unit 1305. Program code 1350 and computer readable storage medium 1345 form computer program product 1355 in these examples. In one example, computer readable storage medium 1345 may be in a tangible form, such as, for example, an optical or magnetic disc that is inserted or placed into a drive or other device that is part of persistent storage 1315 for transfer onto a storage device, such as a hard drive that is part of persistent storage 1315. In a tangible form, computer readable storage medium 1345 also may take the form of a persistent storage, such as a hard drive, a thumb drive, or a flash memory that is connected to data processing system 1300. The tangible form of computer readable storage medium 1345 is also referred to as computer recordable storage media or a computer readable data storage device. In some instances, computer readable storage medium 1345 may not be removable. In one example, program code 1350 contains program code, which when executed, causes enhanced compilation system 1335 to be fully functional.

Alternatively, program code 1350 may be transferred to data processing system 1300 from computer readable storage medium 1345 through a communications link to communications unit 1320 and/or through a connection to input/output unit 1325. The communications link and/or the connection may be physical or wireless in the illustrative examples.

In some illustrative embodiments, program code 1350 may be downloaded over a network to persistent storage 1315 from another device or data processing system for use within data processing system 1300. For instance, program code stored in a computer readable data storage device in a server data processing system may be downloaded over a network from the server to data processing system 1300. The data processing system providing program code 1350 may be a server computer, a client computer, or some other device capable of storing and transmitting program code 1350.

Thus, is described in one embodiment, a computer-implemented process for modeling data cache utilization in a loop nest. The computer-implemented process comprising, in response to receiving a loop nest, processes each loop in the nest, commencing with an innermost loop, estimating the total data cache lines fetched for executing one iteration of the loop under consideration. The computer-implemented process further determining whether data cache reuse is possible across loop iterations, using data cache lines fetched in one iteration and set of cache associativity constraints. In response to receiving information on cache constraints, the computer-implemented process estimating for each pair of memory reference whether one reference can reuse the data cache line fetched from another reference. In response to receiving information on all memory references which result in a cache miss, the computer-implemented process estimating the total number of cache misses for all iterations of a given loop. In response to estimating the total number of total cache misses for all iterations of the given loop, the computer-implemented process processing a next outer loop to estimate the number of total cache misses for all iterations of the next outer loop. The computer-implemented process computing an output of total cache misses of a reference for a single iteration of the next outer loop as equal to the total cache misses for an entire inner loop. The data cache model is then used to estimate the memory cost of the loop unroll and jam transformation, without performing the transformation. This cache model is extended to estimate the best unroll and jam factors for a given loop nest, that can minimize the total cache misses incurred by the memory references in the loop body.

In an alternative embodiment of the disclosure, a computer-implemented process estimates optimal unroll-and-jam factors in a loop nest, without considering the instruction cache cost as a limiting factor. In this alternative embodiment of the disclosure, a computer-implemented process for modeling data cache utilization in a loop nest, comprising, given a loop nest containing n loops, considering all possible unroll-and-jam factors, $(U_1, U_2, \ldots, U_n)$, for the n loops in the loop nest. Given the unroll-and-jam factors, the computer-implemented process estimating total number of cache misses for each reference in a loop body. The computer-implemented process estimating memory reuse possible after the loop unroll and jam transformation considering possible scalar reuse and data cache line reuse from the unrolled copies.

The computer-implemented process determining whether the estimated number of conflict misses increased from the previously recorded ones and in response to a determination the conflict misses increased, the search space for unroll-and-jam factors is constrained by ignoring unroll-and-jam factors that are greater than the current ones, then returning to consider other possible unroll-and-jam factors. The computer-implemented process in response to a determination the conflict misses did not increase, given the unroll-and-jam factors, estimating register pressure and spill cost of an unroll-and-jam after the loop unroll-and-jam transformation by the given unroll factors, without performing a transformation, wherein a number of copies of each type of registers would be required after the loop unroll-and-jam transformation is estimated and possible register reuse based on the unroll factors is estimated.

The computer-implemented process estimating a memory cost of the loop body after the loop unroll-and-jam transformation, without performing the loop unroll-and-jam transformation. Determining, by the computer-implemented process, for the set of unroll factors $(U_1, U_2, \ldots, U_n)$ whether the memory cost is a smallest cost until now. In response to a determination the memory cost is the smallest cost until now, recording by the computer-implemented process, the set of unroll-and-jam factors $(U_1, U_2, \ldots, U_n)$ with the smallest memory cost and corresponding memory cost, then continuing to search for optimal unroll-and-jam factors. In response to a determination, by the computer-implemented process, the memory cost is not the smallest cost until now, returning to consider all other possible unroll-and-jam factors.

In another alternative embodiment of the disclosure, a computer-implemented process estimates optimal unroll-and-jam factors in a loop nest, in which the search space for the unroll factors is not constrained while searching for an optimal unroll and jam factor. Given a loop nest containing n loops, considering all possible unroll-and-jam factors, $(U_1, U_2, \ldots, U_n)$, for the n loops in the loop nest and using given the unroll-and-jam factors, estimating cost, in terms of instruction cache size, of the loop body after an unroll-and-jam. A determination is made as to whether an unrolled instruction cost is smaller than a maximum instruction cache size.

In response to a determination the unrolled instruction cost is not smaller than a maximum instruction cache size, returning to consider all other possible unroll-and-jam factors, $(U_1, U_2, \ldots, U_n)$, for the n loops in the loop nest. In response to a determination the unrolled instruction cost is smaller than a maximum instruction cache size, estimating total cache misses of each reference in the loop body. Further processing to estimate memory reuse possible after the loop unroll and jam transformation, considering possible scalar reuse and data cache line reuse from unrolled copies. The process determining whether conflict misses increased and in response to a determination the conflict misses increased, ignoring current unroll and jam factors, returning to consider all other possible unroll-and-jam factors.

In response to a determination the conflict misses did not increase, given the unroll-and-jam factors, estimating register pressure and spill cost of the unroll-and-jam after a loop unroll-and-jam transformation by the given unroll factors, without performing a transformation, wherein a number of copies of each type of registers to be required after the loop unroll-and-jam transformation is estimated and possible register reuse based on the unroll factors is estimated.

Estimating a memory cost of the loop body after the loop unroll-and-jam transformation, is performed without performing the loop unroll-and-jam transformation. A determination is made as to whether, for the unroll factors $(U_1, U_2, \ldots, U_n)$, the memory cost is a smallest cost until now. In response to a determination the memory cost is the smallest cost until now, recording the unroll-and-jam factor with the smallest memory cost and corresponding memory cost. Returning to consider all other possible unroll-and-jam factors. In response to a determination the memory cost is not the smallest cost until now, returning to consider all other possible unroll-and-jam factors.

In accordance with one or more embodiments of the present invention, a computer process is provided for modeling data cache utilization in a loop nest. The process incudes given a loop nest containing n loops, considering all possible unroll-and-jam factors, $(U_1, U_2 \ldots, U_n)$, for the n loops in the loop nest. The process also incudes given the unroll-and-jam factors, estimating total number of cache misses for each reference in a loop body. The process also includes estimating if memory reuse is possible after a loop unroll and jam transformation considering possible scalar reuse and data cache line reuse from unrolled copies. The process also includes determining whether an estimated number of conflict misses increased. The process also includes in response to a determination the estimated number of conflict misses increased, returning to consider all possible unroll-and-jam factors, and the search space for unroll-and-jam factors is constrained by ignoring unroll-and-jam factors that are greater than current unroll-and-jam factors. The process also includes in response to a determination the conflict misses did not increase, given the unroll-and-jam factors, estimating register pressure and spill cost of a unroll-and-jam after a loop unroll-and-jam transformation by the given unroll factors, without performing a transformation, wherein a number of copies of each type of registers to be required after the loop unroll-and-jam transformation is estimated and possible register reuse based on the unroll factors is estimated. The process also includes estimating a memory cost of the loop body after the loop unroll-and-jam transformation, without performing the unroll-and-jam transformation. The process also includes determining for the unroll factors $(U_1, U_2 \ldots, U_n)$ whether the memory cost is a smallest cost until now. The process also includes in response to a determination the memory cost is the smallest cost until now, recording the unroll-and-jam factor with the smallest memory cost and corresponding memory cost. The process also includes continuing to search for optimal unroll-and-jam factors, and in response to a determination the memory cost is not the smallest cost until now, returning to consider all possible unroll-and-jam factors.

In accordance with one or more embodiments of the present invention, a computer process is provided for modeling data cache utilization in a loop nest is provided. The process includes given a loop nest containing n loops, considering all possible unroll-and-jam factors, $(U_1, U_2 \ldots, U_n)$, for the n loops in the loop nest. The process also includes given the unroll-and-jam factors, estimating instruction cost, in terms of cache size, of the loop body after an unroll-and-jam. The process also includes determining whether an unrolled instruction cost is smaller than a maximum instruction cache size. The process also includes in response to a determination the unrolled instruction cost is not smaller than a maximum instruction cache size, returning to consider all possible unroll-and-jam factors, $(U_1, U_2 \ldots, U_n)$, for the n loops in the loop nest. The process also includes in response to a determination the unrolled instruction cost is smaller than a maximum instruction cache size, estimating total cache misses of each reference in the loop body. The process also includes estimating memory reuse possible after a loop unroll and jam transformation, considering possible scalar reuse and data cache line reuse from unrolled copies. The process also includes determining whether conflict misses increased. The process also includes in response to a determination the conflict misses increased, ignoring current unroll and jam factors, returning to consider all possible unroll-and-jam factors. The process also includes in response to a determination the conflict misses did not increase, given the unroll-and-jam factors, estimating register pressure and spill cost of the unroll-and-jam after a loop unroll-and-jam transformation by the given unroll factors, without performing a transformation, wherein a number of copies of each type of registers to be required after the loop unroll-and-jam transformation is estimated and possible register reuse based on the unroll factors is estimated. The process also includes estimating a memory cost of the loop body after the loop unroll-and-jam transformation, without performing the loop unroll-and-jam transformation. The process also includes determining for the unroll factors (U1, U2 ..., Un) whether the memory cost is a smallest cost until now. The process also includes in response to a determination the memory cost is the smallest cost until now, recording the unroll-and-jam factor with the smallest memory cost and corresponding memory cost. The process also includes returning to consider all possible unroll-and-jam factors; and in response to a determination the memory cost is not the smallest cost until now, returning to consider all possible unroll-and-jam factors.

According to an embodiment of the disclosure, a computer-implemented process for modeling data cache utilization in a loop nest, in response to receiving a loop nest, processes each loop in the nest, commencing with an innermost loop, estimates the total data cache lines fetched for executing one iteration of the loop under consideration, and determines whether data cache reuse is possible across loop iterations, using data cache lines fetched in one iteration and a set of cache associativity constraints. In response to receiving information on cache constraints, the process estimates, for each pair of memory references in the loop, whether one reference can reuse the data cache line fetched by another reference. In response to receiving information on all memory references which result in a cache miss, the total number of cache misses is estimated for all iterations of a given loop. In response to estimating the total number of cache misses for all iterations of the given loop, a next outer loop is processed to estimate the number of total cache misses for all iterations of the next outer loop. An output of total cache misses of a reference for a single iteration of the next outer loop is computed as equal to the total cache misses for an entire inner loop. The data cache model is then used to estimate the memory cost of the loop unroll and jam transformation, without performing the transformation. This cache model is extended to estimate the best unroll and jam factors for a given loop nest, that can minimize the total cache misses incurred by the memory references in the loop body.

According to another embodiment of the disclosure, a system for modeling data cache utilization in a loop nest, comprising a bus, a memory connected to the bus, having computer executable instructions stored thereon and one or more processors connected to the bus, wherein at least one of the one or more processors executes the computer executable instructions of a method. The method comprising, in response to receiving a loop nest, processing each loop in the nest, commencing with an innermost loop, to estimate a total data cache lines fetched for executing one iteration of the loop under consideration. The system further determining whether data cache line reuse is possible across loop iterations, using data cache lines fetched in one iteration and a set of cache associativity constraints. In response to receiving information on cache constraints, the system estimates for each pair of memory reference whether one reference can reuse a data cache line fetched by another reference. In response to receiving information on all memory references which result in a cache miss, the system further estimates a total number of cache misses for all iterations of a given loop. In response to estimating the total number of cache misses for all iterations of the given loop, the system processes a next outer loop to estimate the total number of cache misses for all iterations of the next outer loop. The system further computes an output of total cache misses of a reference for a single iteration of the next outer loop as equal to the total cache misses for an entire inner loop.

According to another embodiment of the disclosure, a computer program product comprising a computer readable storage medium having computer readable program instructions, for modeling data cache utilization in a loop nest, thereon for causing a processor to perform a method. The method comprising, in response to receiving the loop nest, processing each loop in the loop nest, commencing with an innermost loop, to estimate a total data cache lines fetched for executing one iteration of a loop under consideration. The method determining whether data cache line reuse is possible across loop iterations using data cache lines fetched in one iteration and a set of cache associativity constraints. In response to receiving information on cache constraints, the method estimating for each pair of memory reference whether one reference can reuse a data cache line fetched by another reference. In response to receiving information on all memory references which result in a cache miss, the method estimates a total number of cache misses for all iterations of a given loop. In response to estimating the total number of cache misses for all iterations of the given loop, a next outer loop is processed to estimate the total number of cache misses for all iterations of the next outer loop. An output of total cache misses of a reference for a single iteration of the next outer loop is computed by the method as equal to the total cache misses for an entire inner loop.

In another embodiment of the disclosure a computer-implemented process estimates the optimal unroll-and-jam factors in a loop nest, given a loop nest containing n loops, considers all possible unroll-and-jam factors, $(U_1, U_2, \ldots, U_n)$, for the n loops in the loop nest. Given the unroll-and-jam factors, the computer-implemented process estimates total number of cache misses for each reference in a loop body. The computer-implemented process estimates memory reuse possible after the loop unroll and jam transformation considering possible scalar reuse and data cache line reuse from unrolled copies.

The computer-implemented process determines whether an estimated number of conflict misses increased from previously recorded ones and in response to a determination the conflict misses increased, the search space for unroll-and-jam factors is constrained by ignoring factors that are greater than the current ones, then returning to consider other possible unroll-and-jam factors. In response to a determination the conflict misses did not increase, given the unroll-and-jam factors, the computer-implemented process estimates register pressure and spill cost after the loop unroll-and-jam transformation by the given unroll factors, without performing the transformation, wherein a number of copies of each type of registers would be required after the loop unroll-and-jam transformation is estimated and possible register reuse based on the unroll factors is estimated.

The computer-implemented process further estimates a memory cost of the loop body after the loop unroll-and-jam transformation, without performing the loop unroll-and-jam transformation. Determining, by the computer-implemented process, for the set of unroll factors $(U_1, U_2, \ldots, U_n)$ whether the memory cost is a smallest cost until now. In response to a determination the memory cost is the smallest cost until now, recording by the computer-implemented process, the set of unroll-and-jam factors $(U_1, U_2, \ldots, U_n)$ with the smallest memory cost and corresponding memory cost, then continuing to search for optimal unroll-and-jam factors. In response to a determination, by the computer-implemented process, the memory cost is not the smallest cost until now, returning to consider all other possible unroll-and-jam factors.

In another alternative embodiment of the disclosure, a computer-implemented process estimates optimal unroll-and-jam factors in a loop nest, in which the search space for the unroll factors is not constrained while searching for an optimal unroll and jam factor. Given a loop nest containing n loops, the computer-implemented process considers all possible unroll-and-jam factors, $(U_1, U_2, \ldots, U_n)$, for the n loops in the loop nest. Given the unroll-and-jam factors, the computer-implemented process estimates the instruction cost, in terms of instruction cache size, of the loop body after an unroll-and-jam. A determination is made by the computer-implemented process as to whether an unrolled instruction cache cost is smaller than a maximum instruction cache size.

In response to a determination the unrolled instruction cache cost is not smaller than a maximum instruction cache size, the computer-implemented process returns to consider all other unroll-and-jam factors, $(U_1, U_2, \ldots, U_n)$, for the n loops in the loop nest. In response to a determination the unrolled instruction cost is smaller than a maximum instruction cache size, the computer-implemented process estimates total cache misses for each reference in the loop body. The computer-implemented process estimates memory reuse possible after the loop unroll and jam transformation, considering possible scalar reuse and data cache line reuse from the unrolled copies.

The computer-implemented process determines whether the estimated number of conflict misses increased from the previously recorded ones and in response to a determination the conflict misses increased, ignoring current unroll and jam factors, returning to consider other possible unroll-and-jam factors. In response to a determination the conflict misses did not increase, given the unroll-and-jam factors, the computer-implemented process estimates register pressure and spill cost after the loop unroll-and-jam transformation by the given unroll factors, without performing the transformation, wherein a number of copies of each type of registers to be required after the loop unroll-and-jam transformation is estimated and possible register reuse based on the unroll factors is estimated.

The computer-implemented process further estimates a memory cost of the loop body after the loop unroll-and-jam transformation, without performing the loop unroll-and-jam transformation. Determining, by the computer-implemented process, for the set of unroll factors $(U_1, U_2, \ldots, U_n)$ whether the memory cost is a smallest cost until now. In response to a determination the memory cost is the smallest cost until now, recording by the computer-implemented process, the set of unroll-and-jam factors $(U_1, U_2, \ldots, U_n)$ with the smallest memory cost and corresponding memory cost, then continuing to search for optimal unroll-and-jam factors. In response to a determination, by the computer-implemented process, the memory cost is not the smallest cost until now, returning to consider all other possible unroll-and-jam factors.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented process for modeling data cache utilization in a loop nest, the computer-implemented process comprising:

in response to receiving the loop nest, processing each loop in the loop nest, starting from an innermost loop, estimating total data cache lines fetched for executing one iteration of the loop under consideration;

determining whether data cache line reuse is possible across loop iterations using data cache lines fetched in one iteration and set associativity constraints;

in response to receiving information on cache constraints, estimating for each pair of memory references whether one reference can reuse a data cache line fetched by another reference;

in response to receiving information on all memory references which result in a cache miss, estimating a total number of cache misses for all iterations of a given loop;

in response to estimating the number of total cache misses for all iterations of the given loop, processing a next outer loop to estimate the total number of cache misses for all iterations of the next outer loop; and computing an output of total cache misses of a reference for a single iteration of the next outer loop as equal to the total cache misses for an entire inner loop.

2. The computer-implemented process of claim 1, wherein the estimating total cache lines fetched for executing one iteration of a loop under consideration comprises:

in response to receiving as input a loop, initializing an empty set, unique_cache_lines to store all references which fetch a unique data cache line;

analyzing every pair of memory references, Ref1, Ref2, for each memory reference Ref1 from a loop body of the given loop and a corresponding memory reference Ref2 from the set unique_cache_lines;

in response to determining the set unique_cache_lines is empty, adding a first memory reference Ref1 when Ref1 cannot reuse data cache lines already fetched by any Ref2 from the set unique_cache_lines;

computing stride (Ref1, Ref2), to estimate whether a same data cache line can be reused;

determining whether the stride (Ref1, Ref2) is less than a data cache line size;

in response to determining the stride (Ref1, Ref2) is less than the data cache line size, Ref1 can reuse the data cache line fetched by Ref2, and Ref1 can be ignored;

analyzing a next pair of memory references;

in response to determining the stride (Ref1, Ref2) is not less than the data cache line size, identifying Ref1 as a cache miss; and adding Ref1 to the set unique_cache_lines.

3. The computer-implemented process of claim 1, wherein the determining whether data cache line reuse is possible across loop iterations using data cache lines fetched in one iteration and set associativity constraints comprises;

in response to analyzing all memory references in a loop body for the given loop, initializing each memory reference to belong to a unique set wherein sets are merged, such that references belonging to a same cache set are assigned to the same set;

considering every pair of references Ref1 and Ref2 from different sets in an analysis until reaching convergence, wherein there is no change after iterating over all unique sets;

in response to a determination analysis has not converged, determining whether Ref1 and Ref2 map to a same cache set;

in response to a determination Ref1 and Ref2 map to the same cache set, merging Ref2 to Ref1 cache set;

in response to a determination analysis has converged, determining a size of a cache set with a largest number of memory references;

initializing MaxSet to be the size of a largest cache set;

determining whether the size of the largest cache set, MaxSet, is greater than set associativity;

in response to a determination MaxSet is greater than set associativity, determining references in the loop body will incur conflict misses;

disabling any inter-iteration reuse process;

indicating a cache miss; and in response to a determination MaxSet is not greater than set associativity, indicating no conflict misses.

4. The computer-implemented process of claim 1, wherein the estimating for each pair of memory references whether one reference can reuse a data cache line fetched by another reference comprises:

in response to receiving a given loop L, and a set of unique_cache_lines populated with references that fetch a unique cache line when executing a single iteration of L, considering all pairs of accesses Ref1 and Ref2 in the set of unique_cache_lines;

in response to calculating a dependence distance between Ref1 and Ref2, determining whether a dependence exists;

in response to a determination there is no dependence distance between Ref1 and Ref2, estimating there is no cache line reuse;

in response to a determination there is a dependence distance between Ref1 and Ref2, determining whether loop independent dependence exists;

in response to a determination the dependence distance is loop independent, identifying both references Ref1 and Ref2 access a same cache line and removing Ref2 from the set unique_cache_lines;

considering a next pair of references;

determining whether the dependence distance for all loops enclosing the references except at L is 0;

in response to a determination the dependence distance is not zero for all loops enclosing the references except at L, identifying no cache reuse between Ref1 and Ref2;

in response to a determination the dependence distance is zero for all loops enclosing the references except at L, indicating a possibility of data cache line reuse across iterations of L;

determining whether the dependence distance for L is constant and less than a predetermined constant k;

in response to a determination the dependence distance for L is constant and less than the predetermined constant k, identifying both references Ref1 and Ref2 access a same data cache line and removing Ref2 from the set unique_cache_lines; and in response to a determination the distance for L is not constant and less than the predetermined constant k, identifying no cache reuse between Ref1 and Ref2.

5. The computer-implemented process of claim 1, wherein the estimating a total number of cache misses for all iterations of a given loop comprises:

in response to receiving a given loop L, considering all memory references Ref in a loop body;

determining whether a reference Ref can reuse a data cache line;

in response to determination the reference Ref can reuse the data cache line, fetching a next memory reference;

in response to determination the reference Ref cannot reuse the data cache line, estimating the total data cache lines required by the reference Ref over all iterations of the given loop as a sum of the total estimated data cache lines fetched for the loop L and the total data cache lines required; and iterating over a remainder of the memory references Ref from the loop body until all memory references are used.

6. The computer-implemented process of claim 1, further comprising:

given the loop nest containing n loops considering all possible unroll factors, (U1, U2 . . . ,Un), for the n loops in the loop nest;

estimating an instruction cache cost, in terms of a cache size for a loop body if the loop was unroll-and-jammed by a given unroll factor, without performing a loop transformation;

determining whether the instruction cache cost estimated, in terms of a cache size is smaller than a maximum instruction cache size available;

in response to a determination the instruction cache cost estimated in terms of a cache size is not smaller than a maximum instruction cache size available, ignoring the unroll factor to constrain a search space;

in response to a determination the instruction cache cost estimated in terms of a cache size, is smaller than a maximum instruction cache size available, estimating a total number of cache misses of each reference in the loop body estimating memory reuse possible after the loop unroll and jam transformation as a number of unique memory references Ref required after the loop unroll-and-jam transformation considering possible data cache line reuse from unrolled copies and given unroll-jam factors;

determining whether a number of conflict misses has increased;

in response to a determination the number of conflict misses has increased, constraining a search space;

in response to a determination the number of conflict misses has not increased, estimating a register pressure and total spills cost after a loop unroll-and-jam transformation by the given unroll factors, without performing the loop unroll-and-jam transformation, wherein a number of copies of each register required after the loop transformation is computed considering possible register reuse based on the unroll factors;

determining, for the set of unroll factors (U1, U2 . . . , Un) whether a memory cost is smallest till now, in response to a determination the memory cost is smallest till now, recording unroll factors with a smallest memory cost and a corresponding memory cost;

returning to consider all possible unroll-and-jam factors; and in response to a determination the memory cost is not smallest till now, returning to consider all possible unroll-and-jam factors.

7. A computer system for modeling data cache utilization in a loop nest, the computer system comprising:

one or more processors for executing computer-readable instructions, the computer-readable instructions controlling the one or more processors to perform a method comprising:

in response to receiving the loop nest, processing each loop in the loop nest, starting from an innermost loop, estimating total data cache lines fetched for executing one iteration of the loop under consideration;

determining whether data cache line reuse is possible across loop iterations using data cache lines fetched in one iteration and set associativity constraints;

in response to receiving information on cache constraints, estimating for each pair of memory references whether one reference can reuse a data cache line fetched by another reference;

in response to receiving information on all memory references which result in a cache miss, estimating a total number of cache misses for all iterations of a given loop;

in response to estimating the number of total cache misses for all iterations of the given loop, processing a next outer loop to estimate the total number of cache misses for all iterations of the next outer loop; and computing an output of total cache misses of a reference for a single iteration of the next outer loop as equal to the total cache misses for an entire inner loop.

8. The computer system of claim 7, wherein the estimating total data cache lines fetched for executing one iteration of a loop under consideration comprises:

in response to receiving as input a loop, initializing an empty set, unique_cache_lines to store all references which fetch a unique data cache line;

analyzing every pair of memory references, Ref1, Ref2, for each memory reference Ref1 from a loop body of the given loop and a corresponding memory reference Ref2 from the set unique_cache_lines;

in response to determining the set unique_cache_lines is empty, adding a first memory reference Ref1 when Ref1 cannot reuse data cache lines already fetched by any Ref2 from the set unique_cache_lines;

computing stride (Ref1, Ref2), to estimate whether a same data cache line can be reused;

determining whether the stride (Ref1, Ref2) is less than a data cache line size;

in response to determining the stride (Ref1, Ref2) is less than the data cache line size, determining Ref1 can reuse the data cache line fetched by Ref2, and Ref1 can be ignored;

analyzing a next pair of memory references;

in response to determining the stride (Ref1, Ref2) is not less than the data cache line size, identifying Ref1 as a cache miss; and adding Ref1 to the set unique_cache_lines.

9. The computer system of claim 7, wherein the determining whether data cache line reuse is possible using data cache lines fetched in one iteration and set associativity constraints comprises;

in response to analyzing all memory references in a loop body for the given loop, initializing each memory reference to belong to a unique set wherein sets are merged, such that references belonging to a same cache set are assigned to the same set;

considering every pair of references Ref1 and Ref2 from different sets in an analysis until reaching convergence, wherein there is no change after iterating over all unique sets;

in response to a determination analysis has not converged, determining whether Ref1 and Ref2 map to a same cache set;

in response to a determination Ref1 and Ref2 map to the same cache set, merging Ref2 to Ref1 cache set;

in response to a determination analysis has converged, determining a size of a cache set with a largest number of memory references;

initializing MaxSet to be the size of a largest cache set;

determining whether the size of the largest cache set, MaxSet, is greater than set associativity;

in response to a determination MaxSet is greater than set associativity, determining references in the loop body will incur conflict misses;

disabling any inter-iteration reuse process;

indicating a cache miss; and in response to a determination MaxSet is not greater than set associativity, indicating no conflict misses.

10. The computer system of claim 7, wherein the estimating for each pair of memory references whether one reference can reuse a data cache line fetched by another reference comprises:

in response to receiving a given loop L, and a set of unique_cache_lines populated with references that fetch a unique cache line when executing a single iteration of L, considering all pairs of accesses Ref1 and Ref2 in the set of unique_cache_lines;

in response to calculating a dependence distance between Ref1 and Ref2, determining whether a dependence exists;

in response to a determination there is no dependence distance between Ref1 and Ref2, estimating there is no cache line reuse;

in response to a determination there is a dependence distance between Ref1 and Ref2, determining whether loop independent dependence exists;

in response to a determination the dependence distance is loop independent, identifying both references Ref1 and Ref2 access a same cache line and removing Ref2 from the set unique_cache_lines;

considering a next pair of references;

determining whether the dependence distance for all loops enclosing the references except at L is 0;

in response to a determination the dependence distance is not zero for all loops enclosing the references except at L, identifying no cache reuse between Ref1 and Ref2;

in response to a determination the dependence distance is zero for all loops enclosing the references except at L, indicating a possibility of data cache line reuse across iterations of L;

determining whether the dependence distance for L is constant and less than a predetermined constant k;

in response to a determination the dependence distance for L is constant and less than the predetermined constant k, identifying both references Ref1 and Ref2 access a same data cache line and removing Ref2 from the set unique_cache_lines; and in response to a determination the distance for L is not constant and less than the predetermined constant k, identifying no cache reuse between Ref1 and Ref2.

11. The computer system of claim 7, wherein the estimating a total number of cache misses for all iterations of a given loop comprises:

in response to receiving a given loop L, considering all memory references Ref in a loop body;

determining whether a reference Ref can reuse a data cache line;

in response to determination the reference Ref can reuse the data cache line, fetching a next memory reference;

in response to determination the reference Ref cannot reuse the data cache line, estimating the total data cache lines required by the reference Ref over all iterations of the given loop as a sum of the total estimated data cache lines fetched for the loop L and the total data cache lines required; and iterating over a remainder of the memory references Ref from the loop body until all memory references are used.

12. The computer system of claim 7, wherein the computer readable instructions further control the one or more processors to perform:

given the loop nest containing n loops considering all possible unroll factors, (U1, U2 . . . ,Un), for the n loops in the loop nest;

estimating an instruction cache cost, in terms of a cache size for a loop body if the loop was unroll-and-jammed by a given unroll factor, without performing a loop transformation;

determining whether the instruction cache cost estimated, in terms of a cache size is smaller than a maximum instruction cache size available;

in response to a determination the instruction cache cost estimated in terms of a cache size is not smaller than a maximum instruction cache size available, ignoring the unroll factor to constrain a search space;

in response to a determination the instruction cache cost estimated in terms of a cache size, is smaller than a maximum instruction cache size available, estimating a total number of cache misses of each reference in the loop body estimating memory reuse possible after the loop unroll and jam transformation as a number of unique memory references Ref required after the loop unroll-and-jam transformation considering possible data cache line reuse from unrolled copies and given unroll-jam factors;

determining whether a number of conflict misses has increased;

in response to a determination the number of conflict misses has increased, constraining a search space;

in response to a determination the number of conflict misses has not increased, estimating a register pressure and total spills cost after a loop unroll-and-jam transformation by the given unroll factors, without performing the loop unroll-and-jam transformation, wherein a number of copies of each register required after the loop transformation is computed considering possible register reuse based on the unroll factors;

determining, for the set of unroll factors (U1, U2 ..., Un) whether a memory cost is smallest till now, in response to a determination the memory cost is smallest till now, recording unroll factors with a smallest memory cost and a corresponding memory cost;

returning to consider all possible unroll-and-jam factors; and in response to a determination the memory cost is not smallest till now, returning to consider all possible unroll-and-jam factors.

13. A computer program product for modeling data cache utilization in a loop nest, the computer program product comprising a computer-readable storage medium having program instructions embodied therewith, the program instructions executable by one or more processors to cause the one or more processors to perform a method comprising:

in response to receiving the loop nest, processing each loop in the loop nest, starting from an innermost loop, estimating total data cache lines fetched for executing one iteration of the loop under consideration;

determining whether data cache line reuse is possible across loop iterations using data cache lines fetched in one iteration and set associativity constraints;

in response to receiving information on cache constraints, estimating for each pair of memory references whether one reference can reuse a data cache line fetched by another reference;

in response to receiving information on all memory references which result in a cache miss, estimating a total number of cache misses for all iterations of a given loop;

in response to estimating the number of total cache misses for all iterations of the given loop, processing a next outer loop to estimate the total number of cache misses for all iterations of the next outer loop; and computing an output of total cache misses of a reference for a single iteration of the next outer loop as equal to the total cache misses for an entire inner loop.

14. The computer program product of claim 13, wherein the estimating total data cache lines fetched for executing one iteration of a loop under consideration comprises:

in response to receiving as input a loop, initializing an empty set, unique_cache_lines to store all references which fetch a unique data cache line;

analyzing every pair of memory references, Ref1, Ref2, for each memory reference Ref1 from a loop body of the given loop and a corresponding memory reference Ref2 from the set unique_cache_lines;

in response to determining the set unique_cache_lines is empty, adding a first memory reference Ref1 when Ref1 cannot reuse data cache lines already fetched by any Ref2 from the set unique_cache_lines;

computing stride (Ref1, Ref2), to estimate whether a same data cache line can be reused;

determining whether the stride (Ref1, Ref2) is less than a data cache line size;

in response to determining the stride (Ref1, Ref2) is less than the data cache line size, determining Ref1 can reuse the data cache line fetched by Ref2, and Ref1 can be ignored;

analyzing a next pair of memory references;

in response to determining the stride (Ref1, Ref2) is not less than the data cache line size, identifying Ref1 as a cache miss; and adding Ref1 to the set unique_cache_lines.

15. The computer program product of claim 13, wherein the determining whether data cache line reuse is possible using data cache lines fetched in one iteration and set associativity constraints comprises:

in response to analyzing all memory references in a loop body for the given loop, initializing each memory reference to belong to a unique set wherein sets are merged, such that references belonging to a same cache set are assigned to the same set;

considering every pair of references Ref1 and Ref2 from different sets in an analysis until reaching convergence, wherein there is no change after iterating over all unique sets;

in response to a determination analysis has not converged, determining whether Ref1 and Ref2 map to a same cache set;

in response to a determination Ref1 and Ref2 map to the same cache set, merging Ref2 to Ref1 cache set;

in response to a determination analysis has converged, determining a size of a cache set with a largest number of memory references;

initializing MaxSet to be the size of a largest cache set;

determining whether the size of the largest cache set, MaxSet, is greater than set associativity;

in response to a determination MaxSet is greater than set associativity, determining references in the loop body will incur conflict misses;

disabling any inter-iteration reuse process;

indicating a cache miss; and in response to a determination MaxSet is not greater than set associativity, indicating no conflict misses.

16. The computer program product of claim 13 wherein the estimating, for each pair of memory reference, whether one reference can reuse a data cache line from another reference comprises:

in response to receiving a given loop L, and a set of unique_cache_lines populated with references that fetch a unique cache line when executing a single iteration of L, considering all pairs of accesses Ref1 and Ref2 in the set of unique_cache_lines;

in response to calculating a dependence distance between Ref1 and Ref2, determining whether a dependence exists;

in response to a determination there is no dependence distance between Ref1 and Ref2, estimating there is no cache line reuse;

in response to a determination there is a dependence distance between Ref1 and Ref2, determining whether loop independent dependence exists;

in response to a determination the dependence distance is loop independent, identifying both references Ref1 and Ref2 access a same cache line and removing Ref2 from the set unique_cache_lines;

considering a next pair of references;

determining whether the dependence distance for all loops enclosing the references except at L is 0;

in response to a determination the dependence distance is not zero for all loops enclosing the references except at L, identifying no cache reuse between Ref1 and Ref2;

in response to a determination the dependence distance is zero for all loops enclosing the references except at L, indicating a possibility of data cache line reuse across iterations of L;

determining whether the dependence distance for L is constant and less than a predetermined constant k;

in response to a determination the dependence distance for L is constant and less than the predetermined constant k, identifying both references Ref1 and Ref2 access a same data cache line and removing Ref2 from the set unique_cache_lines; and in response to a determination the distance for L is not constant and less than the predetermined constant k, identifying no cache reuse between Ref1 and Ref2.

17. The computer program product of claim 13, wherein the estimating a total number of cache misses for all iterations of a given loop comprises:

in response to receiving a given loop L, considering all memory references Ref in a loop body;

determining whether a reference Ref can reuse a data cache line;

in response to determination the reference Ref can reuse the data cache line, fetching a next memory reference;

in response to determination the reference Ref cannot reuse the data cache line, estimating the total data cache lines required by the reference Ref over all iterations of the given loop as a sum of the total estimated data cache lines fetched for the loop L and the total data cache lines required; and iterating over a remainder of the memory references Ref from the loop body until all memory references are used.

18. The computer program product of claim 13, wherein the program instructions are further executable by the one or more processors to perform:

given the loop nest containing n loops considering all possible unroll factors, (U1, U2 . . . ,Un), for the n loops in the loop nest;

estimating an instruction cache cost, in terms of a cache size for a loop body if the loop was unroll-and-jammed by a given unroll factor, without performing a loop transformation;

determining whether the instruction cache cost estimated, in terms of a cache size is smaller than a maximum instruction cache size available;

in response to a determination the instruction cache cost estimated in terms of a cache size is not smaller than a maximum instruction cache size available, ignoring the unroll factor to constrain a search space;

in response to a determination the instruction cache cost estimated in terms of a cache size, is smaller than a maximum instruction cache size available, estimating a total number of cache misses of each reference in the loop body estimating memory reuse possible after the loop unroll and jam transformation as a number of unique memory references Ref required after the loop unroll-and-jam transformation considering possible data cache line reuse from unrolled copies and given unroll-jam factors;

determining whether a number of conflict misses has increased;

in response to a determination the number of conflict misses has increased, constraining a search space;

in response to a determination the number of conflict misses has not increased, estimating a register pressure and total spills cost after a loop unroll-and-jam transformation by the given unroll factors, without performing the loop unroll-and-jam transformation, wherein a number of copies of each register required after the loop transformation is computed considering possible register reuse based on the unroll factors;

determining, for the set of unroll factors (U1, U2 . . . , Un) whether a memory cost is smallest till now, in response to a determination the memory cost is smallest till now, recording unroll factors with a smallest memory cost and a corresponding memory cost;

returning to consider all possible unroll-and-jam factors; and in response to a determination the memory cost is not smallest till now, returning to consider all possible unroll-and-jam factors.

* * * * *